(12) United States Patent
Kalm et al.

(10) Patent No.: US 10,781,043 B1
(45) Date of Patent: Sep. 22, 2020

(54) MULTI-DIRECTIONAL ELEVATOR FOR AN INVENTORY STORAGE SYSTEM

(71) Applicant: Amazon Technologies, Inc., Seattle, WA (US)

(72) Inventors: William Kalm, Seattle, WA (US); Peter Grant, Seattle, WA (US); Robert T. Brown, Jenison, MI (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 16/191,939

(22) Filed: Nov. 15, 2018

(51) Int. Cl.
*B65G 1/04* (2006.01)
*B65G 1/137* (2006.01)

(52) U.S. Cl.
CPC ......... *B65G 1/0492* (2013.01); *B65G 1/0478* (2013.01); *B65G 1/1373* (2013.01)

(58) Field of Classification Search
CPC .. B65G 1/0492; B65G 1/0478; B65G 1/1373; B65G 1/0457; B65G 1/0464
See application file for complete search history.

(56) References Cited

U.S. PATENT DOCUMENTS

| | | | | |
|---|---|---|---|---|
| 3,583,584 A * | 6/1971 | Iacco | ................... | B65G 1/0492 414/279 |
| 4,088,232 A * | 5/1978 | Lilly | ................... | B65G 1/0464 294/65.5 |
| 4,265,582 A * | 5/1981 | Theobald | ............ | B65G 1/0485 414/279 |
| 5,069,592 A * | 12/1991 | Galperin | .............. | B65G 1/0492 414/240 |
| 5,190,427 A * | 3/1993 | Lai | ........................ | B65G 1/0478 414/236 |
| 7,931,431 B2 * | 4/2011 | Benedict | ................. | B63B 25/22 280/755 |
| 9,845,208 B2 * | 12/2017 | Lindbo | ................ | B65G 1/0478 |
| 10,336,540 B2 * | 7/2019 | Gravelle | ................. | B65G 1/04 |

(Continued)

FOREIGN PATENT DOCUMENTS

| | | | | |
|---|---|---|---|---|
| EP | 3431416 A1 * | 1/2019 | ........... | G06Q 10/087 |
| WO | WO-2018190712 A1 * | 10/2018 | ........... | B65G 1/0478 |
| WO | WO-2019094511 A1 * | 5/2019 | ........... | B65G 1/1373 |

OTHER PUBLICATIONS

U.S. Appl. No. 16/037,424, filed Jul. 17, 2018, Kalm et al.

*Primary Examiner* — Kaitlin S Joerger
(74) *Attorney, Agent, or Firm* — BakerHostetler

(57) ABSTRACT

In one embodiment, an inventory storage system has a vertical stack of storage modules. Each storage module has first and second conveyor segments that carry storage containers along a longitudinal direction between first and second modules ends, and third and fourth conveyor segments that carry the containers between the first and second conveyor segments at the first and second module ends, respectively. The conveyor segments define a movement path having a closed shape, and the storage module translates the containers around the movement path until a desired one of the containers is presented at one of the first and second module ends. The system also has a multi-directional elevator having a platform. The elevator moves the platform over the vertical stack along at least one of the longitudinal direction and a lateral direction, and lowers the platform into an interior of the vertical stack.

18 Claims, 9 Drawing Sheets

(56) References Cited

U.S. PATENT DOCUMENTS

| | | | |
|---|---|---|---|
| 2014/0086714 A1* | 3/2014 | Malik | B65G 1/0478 |
| | | | 414/273 |
| 2018/0065804 A1* | 3/2018 | Hognaland | B65G 1/06 |
| 2018/0086559 A1* | 3/2018 | Lindbo | B62D 33/02 |
| 2018/0222676 A1* | 8/2018 | Lindblom | B65G 1/137 |
| 2019/0023492 A1* | 1/2019 | Voloskov | B65G 1/1375 |
| 2019/0026687 A1* | 1/2019 | Voloskov | B65G 1/0478 |
| 2019/0084763 A1* | 3/2019 | Beer | B65G 1/0478 |
| 2019/0225436 A1* | 7/2019 | Lindbo | B65G 67/46 |
| 2019/0233209 A1* | 8/2019 | Gravelle | B65G 1/04 |
| 2019/0308812 A1* | 10/2019 | Lindblom | B65G 1/06 |

* cited by examiner

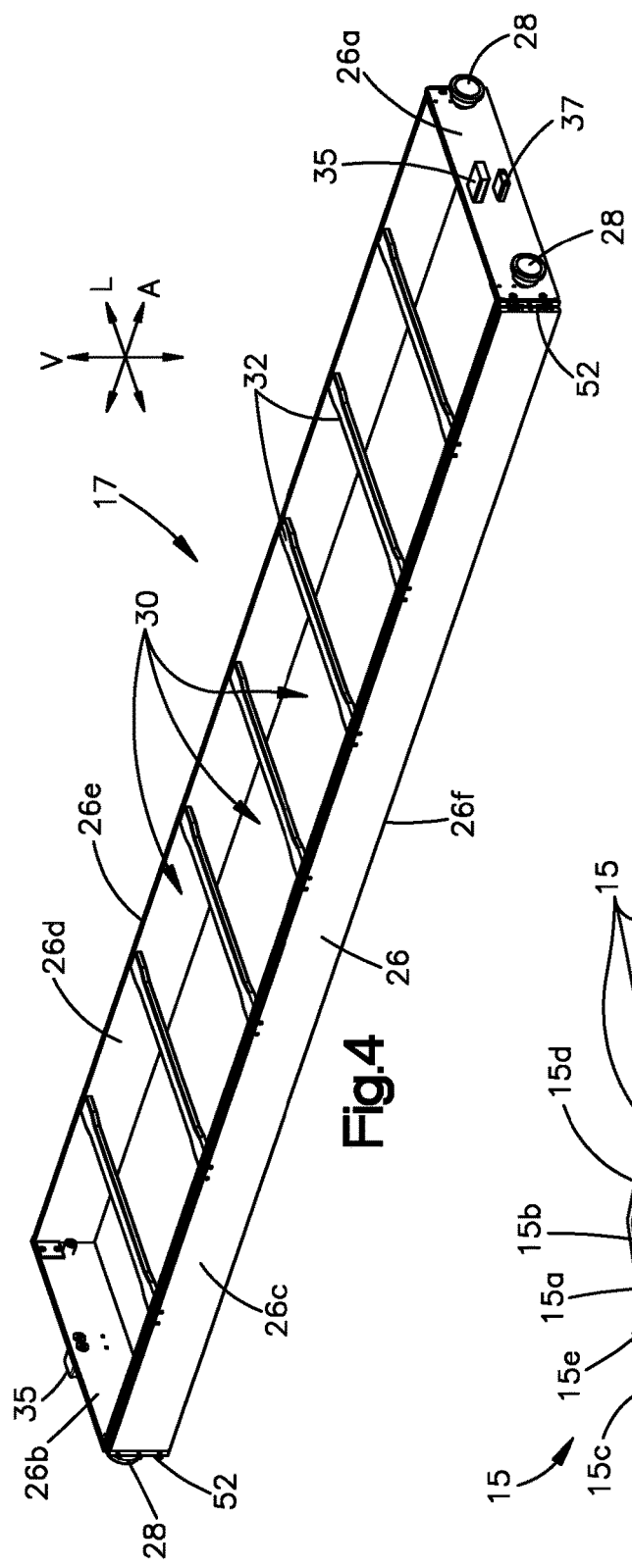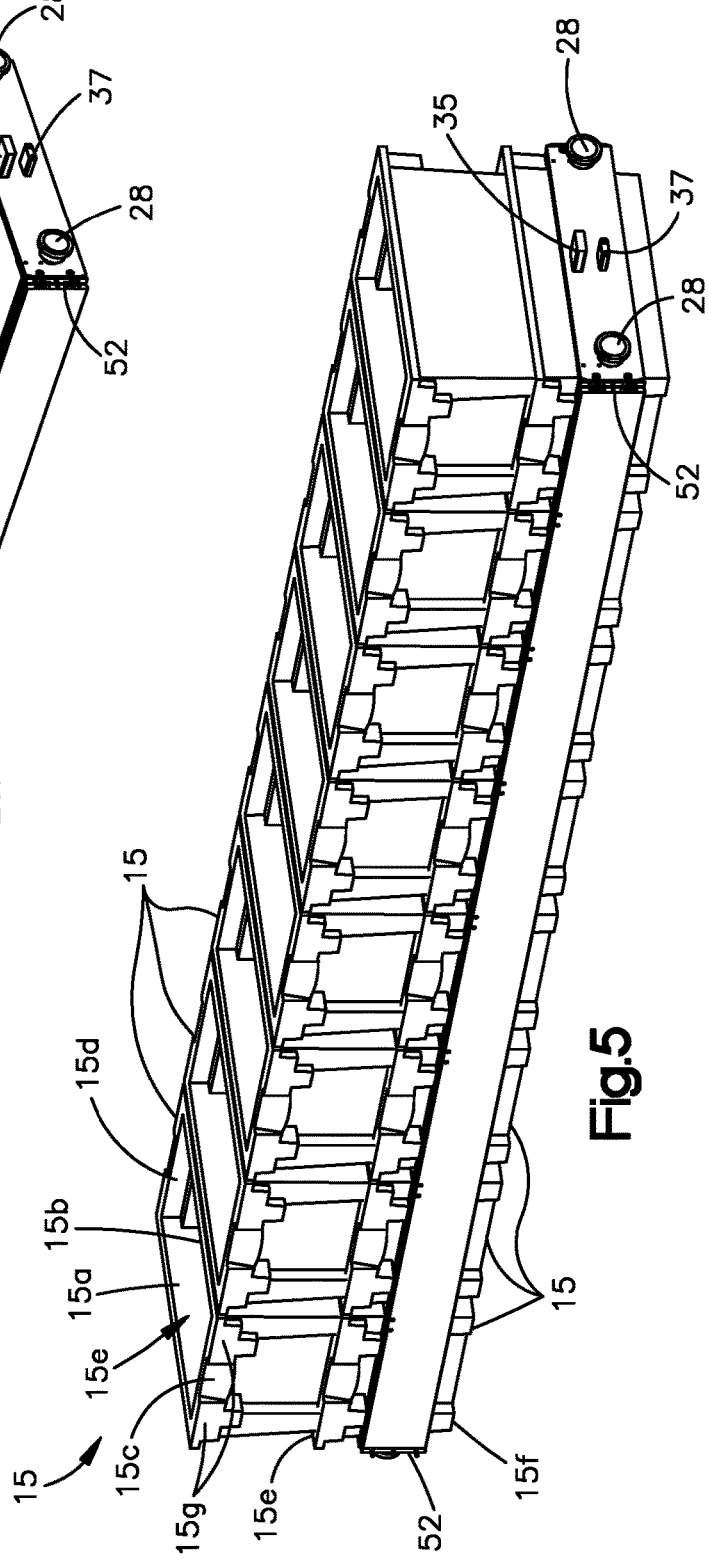

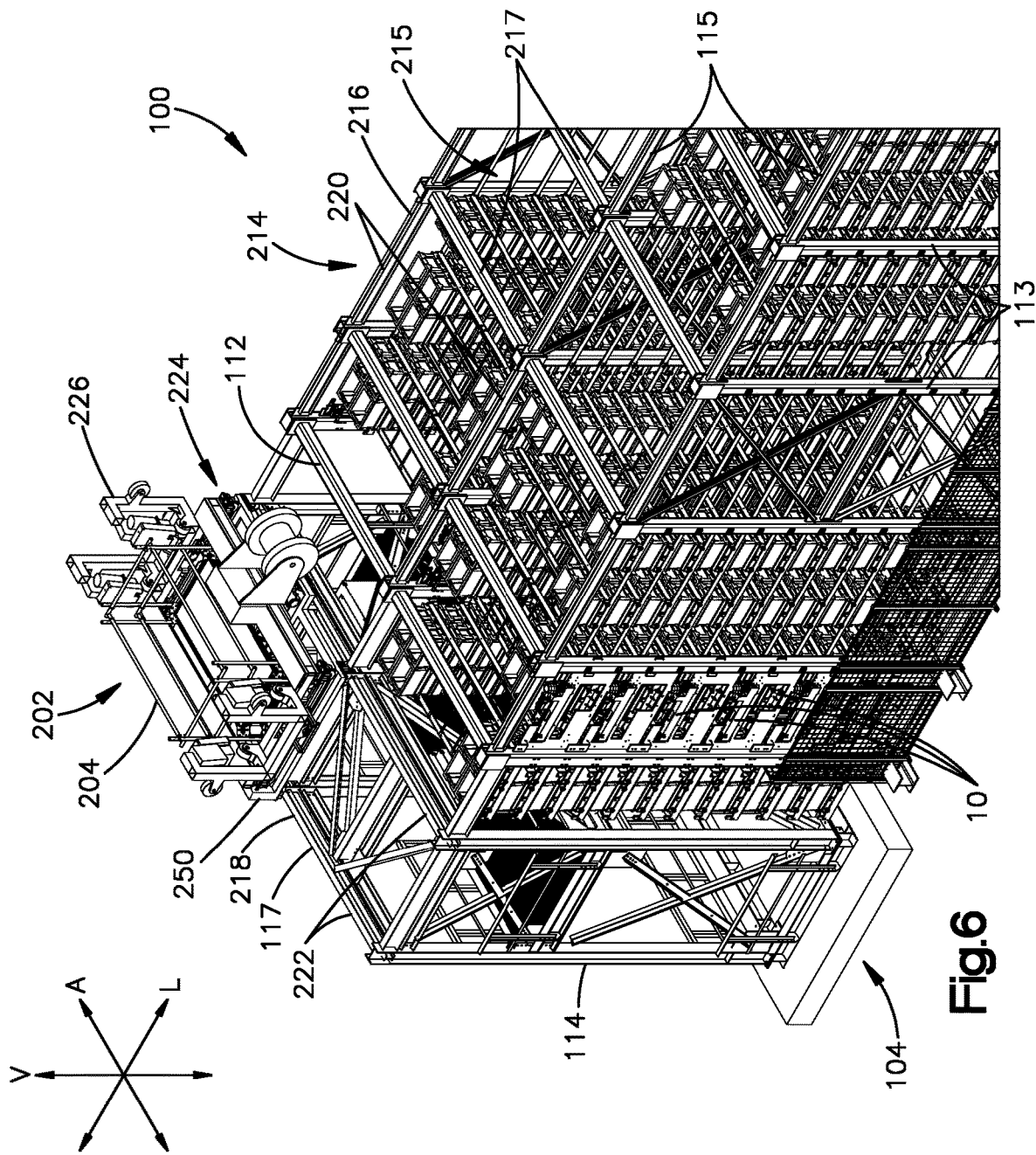

MULTI-DIRECTIONAL ELEVATOR FOR AN INVENTORY STORAGE SYSTEM

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, the inventory item may be carried down an aisle in the warehouse to the desired shelving unit and place the inventory item on the desired shelving unit where it is stored until it is needed. When an order is placed, the inventory item may be retrieved from the desired shelving unit, and place the inventory item on a conveyor belt that carries the inventory item downstream for packaging and shipping. There are some systems in which containers are oriented in rows, and the entire row moves up or down vertically under the control of an operator.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 4 shows a perspective view of one of the container carriers of FIG. 2 according to one example embodiment;

FIG. 5 shows a perspective view of the container carrier of FIG. 4 supporting a plurality of inventory storage containers;

FIG. 6 shows an enlarged perspective view of a second system end of the storage system of FIG. 1;

DETAILED DESCRIPTION

In inventory storage facilities, storage density is an important characteristic. Packing inventory items closer together reduces the overall volume that is needed to store the inventory items. Thus, inventory items can be housed in a smaller building or structure when they are packed closer together than when they are packed further apart. Further, packing inventory items closer together (i.e., increasing storage density) in an existing storage facility can free up warehouse space that can be used to store additional inventory items, thereby increasing the capacity of the storage facility. As inventory items are packed closer together, the spacing between the inventory items decreases. This can present difficulties for maintenance personnel who might need to access tiny spaces between the inventory items to perform maintenance or repairs. Discussed herein are inventory storage systems that can have a higher storage density than the conventional shelving units discussed above, and systems and methods for providing access to an interior of the storage system in between inventory items.

Figure 1:
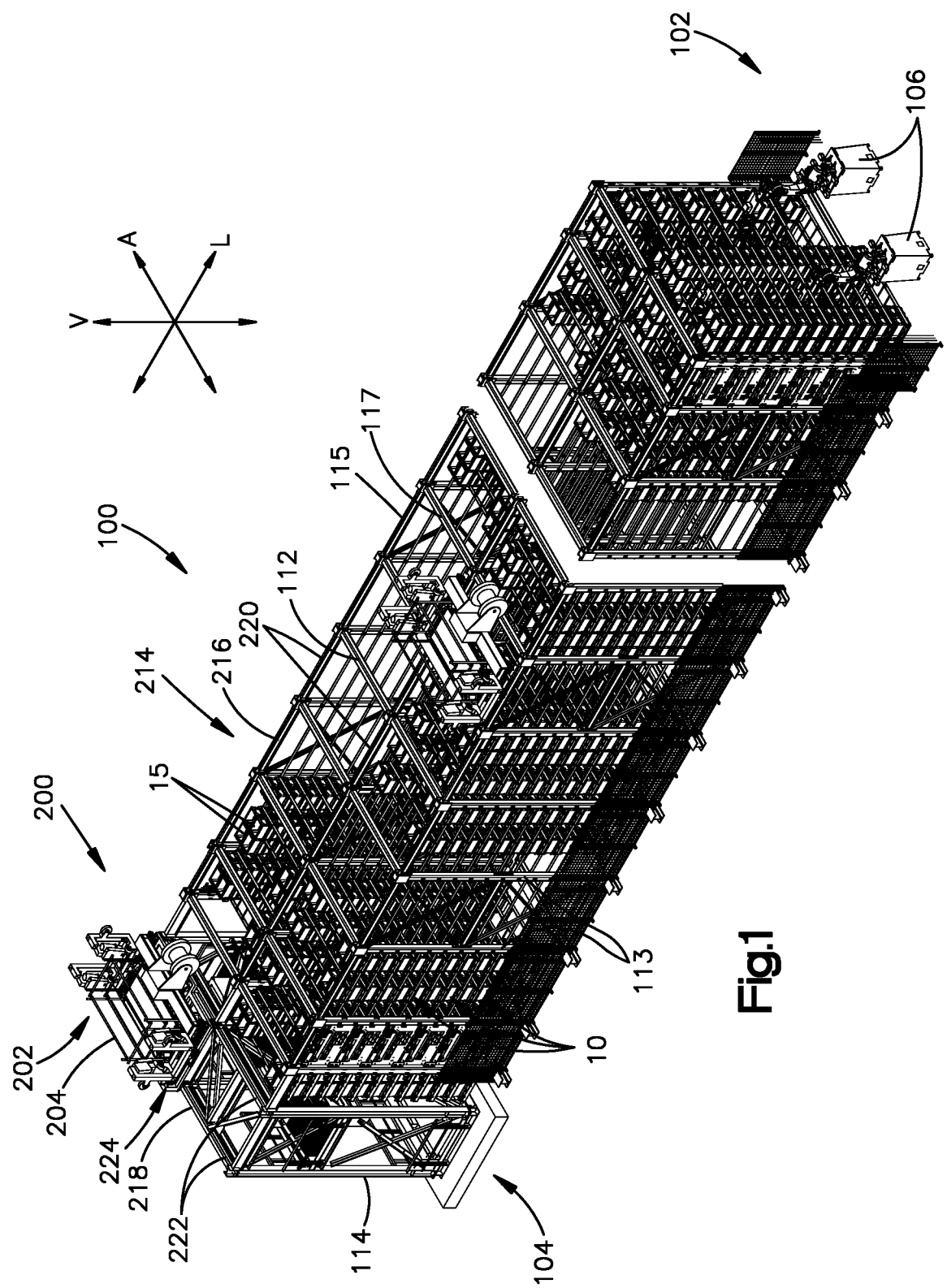
FIG. 1 shows a perspective view of a storage system according to one example embodiment having a plurality of vertical stacks of storage modules and a multi-directional elevator system.

Referring to FIG. 1, in general an inventory storage system 100 comprises a first system end 102 and a second system end 104 that are spaced from one another along a longitudinal direction L. The storage system 100 has at least one vertical stack of storage modules 10 that includes a plurality of the storage modules 10 stacked over one another. Each storage module 10 (see e.g., FIG. 2) is configured to store inventory items in a plurality of storage containers 15. In some embodiments, the system can have a plurality of vertical stacks of the storage modules 10 stacked next to one another. In FIG. 1, two vertical stacks of the storage modules 10 are shown next to one another along a lateral direction, perpendicular to the longitudinal direction L. The longitudinal direction L can be a first horizontal direction, and the lateral direction A can be a second horizontal direction. Each storage module 10 can be modular in the sense that each storage module 10 can be fully functional on its own and can operate independently of the other storage modules 10. In some embodiments, each storage module 10 can be configured in a manner similar to that of any one of the storage modules described in PCT patent application no. PCT/US2018/013920, filed on Jan. 16, 2018, and U.S. patent application Ser. No. 16/037,424, filed Jul. 17, 2018, the teachings of both of which are hereby incorporated by reference as if set forth in their entirety herein. For ease of discussion, the present invention will be described relative to its use with the storage module of U.S. patent application Ser. No. 16/037,424.

The storage system 100 also comprises a maintenance system 200 having a multi-directional elevator 202 that is configured to move over the at least one vertical stack of storage modules 10 to an opening defined between the storage containers 15, and lower into the opening so as to provide access to the interior space of the storage system 100 for maintenance, repair, or other purposes. The multi-directional elevator 202 can have a track system 214 that extends over the at least one vertical stack of storage modules 10, and a trolley system 224 that is configured to move along the track system 214. The maintenance system 200 can also have hardware (discussed below) that is configured to support moving the storage containers 15 apart so as to create the opening into an interior space of the storage system 100.

The storage system 100 can include a frame 112 that supports the track system 214. The frame 112 can include a plurality of posts 113 that extend along the vertical direction V. In some examples, the frame 112, such as the posts 113, can couple the storage modules 10 in a vertical stack to one another so as to maintain the storage modules 10 in a stacked orientation. Further, in some examples, the frame 112, such as the posts 113, can couple vertical stacks of the storage modules 10 next to one another. As shown in FIG. 6, the vertical posts 113 in the center are shared between two laterally-adjacent vertical stacks of storage modules and provide support for the two laterally-adjacent vertical stacks. The frame 112 can include a plurality of longitudinal beams 115 that extend along the longitudinal direction L. The beams 115 can couple the posts 113 to one another along the longitudinal direction L. The frame 112 can include a plurality of lateral beams 115 that extend along the lateral direction A. The lateral beams 115 can couple the posts 113 to one another along the lateral direction A. It will be understood that, in alternative embodiments, the frame 112 can have any other suitable configuration.

The storage system 100 can include at least one robotic manipulator 106, each configured to service one of the first and second system ends 102 and 104 of the storage system 100. For example, the storage system 100 can include a plurality of robotic manipulators 106 that service at least one of the first and second system ends 102 and 104. In FIG. 1, robotic manipulators 106 are shown at the first system end 102; however it will be understood that robotic manipulators 106 could additionally or alternatively be disposed at the second system end 102. In some embodiments, the manipulators 106 can be used to stow inventory items into storage containers 15 that are supported by the storage modules 10 and/or can be used to stow the storage containers 15 onto the storage modules 10. Additionally or alternatively, the manipulators 106 can be used to retrieve inventory items from storage containers 15 that are supported by the storage modules 10 and/or can be used to retrieve the storage containers 15 from the storage modules 10.

Each robotic manipulator 106 may be any suitable material handling robot such as, without limitation, a Cartesian robot, a cylindrical robot, a spherical robot, an articulated robot, a parallel robot, SCARA robot, anthropomorphic robot, any other suitable robotic manipulator and/or robotic arm. The robotic manipulator may include any suitable type and number of sensors disposed throughout the robotic manipulator. The sensors can include sensors configured to detect pressure, force, weight, light, objects, slippage, and any other information that may be used to control and/or monitor the operation of the robotic manipulator, including an end effector. Other material conveyance devices may also be disposed adjacent to the robotic manipulators 106. The other material conveyance devices can be any suitable material conveyance system including, for example, a conveyor surface, and may be used to transport inventory items and/or storage containers 15 to and from the robotic manipulators 106.

Figure 2:
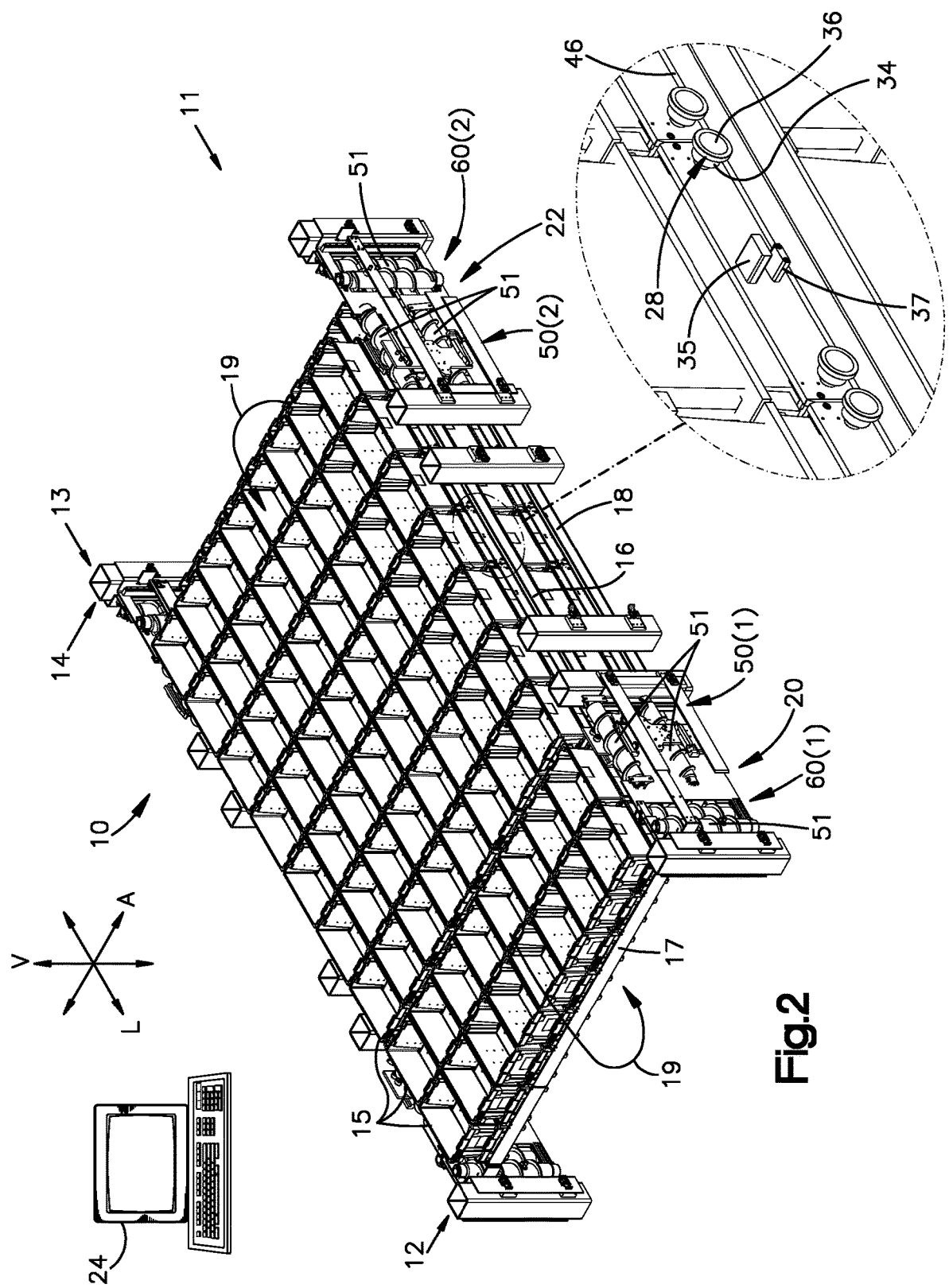
FIG. 2 shows a perspective view of one of the storage modules of FIG. 1 according to one example embodiment, the storage module having a plurality of container carriers that support a plurality of inventory storage containers.
Figure 3:
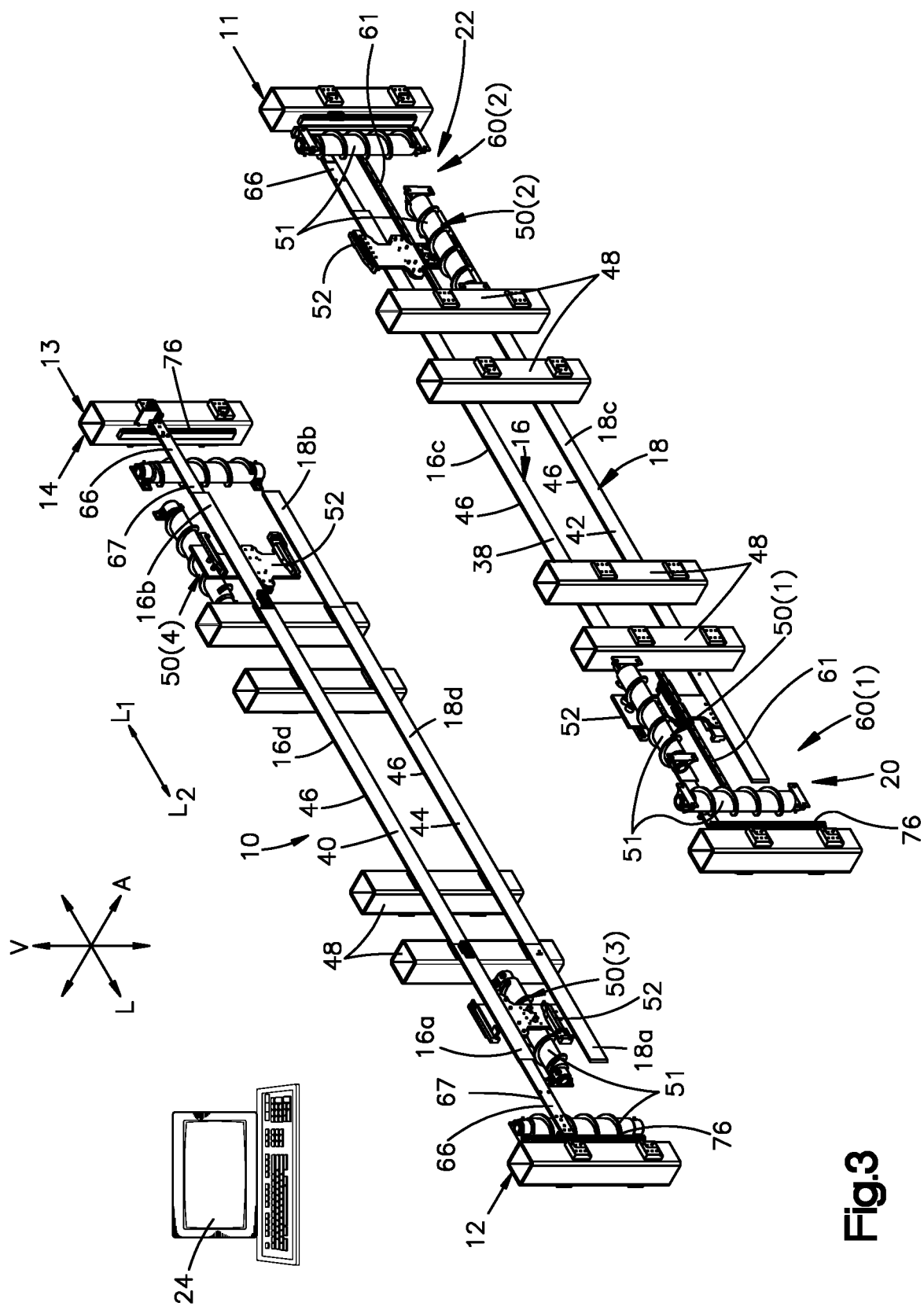
FIG. 3 shows a perspective view of the storage module of FIG. 2 without the container carriers or inventory storage containers.

Turning to FIGS. 2 and 3, one embodiment of an inventory storage module 10 of FIG. 1 is shown. One or more, up to all, of the storage modules 10 in FIG. 1 can be implemented as shown in FIGS. 2 and 3. In FIG. 2, the inventory storage module 10 is shown with storage containers 15, and in FIG. 3, the inventory storage module 10 is shown without storage containers 15. In general, the inventory storage module 10 has a first module end 12 and a second module end 14 spaced from one another along the longitudinal direction L. The storage module 10 also has a first module side 11 and a second module side 13 spaced from one another along the lateral direction A.

The storage module 10 is elongate from its first module end 12 to its second module end 14 along the longitudinal direction L. For example, the storage module 10 has a module length along the longitudinal direction L from its first module end 12 to its second module end 14 that is greater than a module width of the storage module from its first module side 11 to its second module side 13 along the lateral direction A. The module length can also be greater than a module height along a vertical direction V, perpendicular to both the longitudinal direction L and the lateral direction A. The overall dimensions (e.g., module length, module width, and module height) of the storage module 10 may be selected to optimize storage density of the stackable storage module or other suitable parameter. For example, the dimensions may be selected to fit within a particular structure such as a warehouse.

The storage module 10 has a plurality of conveyor segments that define a movement path 19. The movement path 19 can have a closed shape, such as a rectangle, a loop, an oval, or any other suitable closed shape. The storage module 10 is configured to move storage containers 15 around its movement path 19. For example, the storage module 10 has a first conveyor segment 16 and a second conveyor segment 18 that extend along the longitudinal direction L. The storage module 10 also has a third conveyor segment 20 adjacent the first module end 12 and a fourth conveyor segment 22 adjacent the second module end 14. The first and second conveyor segments 16 and 18 are configured to carry inventory storage containers 15 along the longitudinal direction L between the third and fourth conveyor segments 20 and 22. Thus, the first and second conveyor segments 16 and 18 can be considered to be longitudinal conveyor segments. Moreover, the storage module 10 can include at least one movement system 50(1) to 50(4) that is configured to move the storage containers 15 along the first and second conveyor segments 20 and 22. The third and fourth conveyor segments 20 and 22, which can be considered to be connecting conveyor segments, are configured to carry inventory storage containers 15 between the first and second conveyor segments 16 and 18. For example, the third and fourth conveyor segments 20 and 22 can be implemented as first and second vertical lifts 60(1) and 60(2), respectively, that move the storage containers 15 vertically between the first and second conveyor segments 16 and 18. In alternative embodiments, the third and fourth conveyor segments 20 and 22 can be implemented as tracks that connect the first and second conveyor segments 16 and 18.

The conveyor segments 16, 18, 20, and 22 together define the movement path 19. The movement path 19 can be elongate along the longitudinal direction L. The movement path 19 can have a length along the longitudinal direction L that is greater than a height of the movement path along the vertical direction V. The movement path 19 can be considered to be a closed movement path in that the conveyor segments 16, 18, 20, and 22 transfer storage containers 15 only around the movement path 19, without the conveyor segments 16, 18, 20, and 22 transferring storage containers 15 outside of the movement path 19 and without the conveyor segments 16, 18, 20, and 22 transferring storage containers 15 into the movement path 19. However, it will be understood that the storage containers 15 can be removed from, and placed back into, the movement path 19 by, for example, a machine such as a robotic arm.

The first and second longitudinal conveyor segments 16 and 18 can be offset from one another along the vertical direction V as shown. Thus, the first and second longitudinal conveyor segments 16 and 18 can be considered to be upper and lower conveyor segments, respectively. In such embodiments, the movement path 19 can be defined in a plane that extends along the vertical direction V and the longitudinal direction L. Thus, the module height can be defined from the first longitudinal conveyor segment 16 to the second longitudinal conveyor segment 18. In alternative embodiments (not shown), the first and second longitudinal conveyor segments 16 and 18 can be offset from one another along the lateral direction A. In such embodiments, the movement path 19 can be defined in a plane that extends along the longitudinal direction L and the lateral direction A (i.e., a horizontal plane).

The storage module 10 can comprise at least one actuator 51 that is configured to move the inventory storage containers 15 along the movement path 19, such as along one of the first to fourth conveyor segments 16, 18, 20, and 22. For example, each actuator 51 can be configured to move the storage containers 15 along a linear direction such as the longitudinal direction L or the vertical direction V. Each actuator 51 can be supported relative to the conveyor segments 16, 18, 20, and 22 by brackets 53. Each actuator 51 can be implemented as part of one of the movement systems 50(1) to 50(4) or vertical lifts 60(1) and 60(2). In some embodiments, each movement system 50(1) to 50(4) can include an actuator 51. Further, in some embodiments, each vertical lift 60(1) and 60(2) can include at least one actuator 51, such as a pair of actuators 51. At least one, up to all, of the actuators 51 can be implemented as shown in FIGS. 2 and 3. It will be understood that, in alternative embodiments, one or more of the actuators 51 can be implemented as shown in FIGS. 2 and 3 and one or more of the actuators 51 can be implemented as any other suitable linear actuator, such as (without limitation) a motor driven actuator, a pneumatic actuator, a hydraulic actuator, or any of the actuators shown in PCT patent application no. PCT/US2018/013920.

The at least one actuator 51 can be configured to move the storage containers 15 along the movement path 19 until a desired one of the storage containers 15 is presented at one of the first module end 12 and the second module end 14. Thus, the at least one actuator 51 and the conveyor segments 16, 18, 20, and 22 can operate together to translate the storage containers 15 around the movement path 19 until a desired one of the storage containers 15 is presented at one of the first module end 12 and the second module end 14. At such position, the desired storage container 15 can be accessed by, for example, a machine such as a robotic arm, so that an inventory item can then be placed onto the desired storage container 15 for storage or can be removed from the desired storage container 15 to fulfill a customer order or for further transporting or processing. Additionally or alternatively, the machine can remove storage containers 15 from the storage module and place storage containers 15 onto the storage module.

The storage module 10 can operate in a unidirectional manner such that the storage containers 15 can be moved in only a first direction (that is, clockwise or counterclockwise) around the movement path. Alternatively, the storage module 10 can operate in a bidirectional manner such the storage containers 15 can be selectively rotated in one of the first direction and a second direction, opposite the first direction. The movement and positioning of storage containers 15 can be controlled by a controller 24, which can be in wired or wireless communication with the segments of the storage module. The controller 24 can control the speed and optionally the direction in which the storage containers are translated. Further, the controller 24 can stop translation of the storage containers when a desired storage container is presented at one of the first and second ends 12 and 14. Each storage module 10 of the system can be independently operated such that storage containers 15 of each storage module 10 can be driven around their corresponding movement path independently of the storage containers 15 of other storage modules 10 being driven around their corresponding movement path.

In some embodiments, as shown in FIG. 1, the storage module 10 can include a plurality of container carriers 17 (shown in further detail in FIGS. 4 and 5), where each container carrier 17 is configured to support at least one, such as a plurality, of the inventory storage containers 15. Thus, the storage module 10 can be configured to transfer the container carriers 17 around the movement path 19. In such embodiments, the conveyor segments 16, 18, 20, and 22 can be configured to carry the container carriers 17 around the movement path 19 until a desired one of the container carriers 17 is presented at one of the first and second module ends 12 and 14. Thus, the first and second conveyor segments 16 and 18 can be configured to carry the carriers 17 along the longitudinal direction L, and the third and fourth conveyor segments 20 and 22 can be configured to carry container carriers 17 between the first and second conveyor segments 16 and 18. The storage module 10 can be configured such that, when the third and fourth conveyor segments 20 and 22 transfer container carriers 17, at least some, up to all, of the container carriers 17 on the upper and lower conveyor segments 16 and 18 remain stationary. The storage module 10 can be configured such that, when the container carriers 17 are moved along the upper and lower conveyor segments 16 and 18, the third and fourth conveyor segments 20 and 22 do not move any container carriers 17.

With reference to FIG. 2, the first and second conveyor segments 16 and 18 extend between the first module end 12 and the second module end 14, and between the first module side 11 and the second module side 13. The first and second conveyor segments 16 and 18 are each elongate along the longitudinal direction L. For example, each of the first and second conveyor segments 16 and 18 has a segment length along the longitudinal direction L and a segment width along the lateral direction A, where the segment length is greater than the segment width. Each of the longitudinal conveyor segments 16 and 18 can include a conveyor surface, and the storage module can be configured to transfer storage containers 15 along the conveyor surfaces along the longitudinal direction L. The conveyor surfaces can be defined by conveyor elements such as tracks as described below. However, in alternative embodiments, the conveyor surfaces can be defined by belts, rollers, skate wheels, balls, any other suitable conveyor element for translating the storage containers 15, or any suitable combination of conveyor elements.

The first conveyor segment 16 has a first segment end 16a, and a second segment end 16b that is offset from the first segment end 16a along the longitudinal direction L. The first and second segment ends 16a and 16b can be terminal free ends that are free from a fixed connection to another track. The first conveyor segment 16 is elongate from the first segment end 16a to the second segment end 16b. The first conveyor segment 16 has a first lateral side 16c and a second lateral side 16d spaced from the first lateral side 16c along the lateral direction A, perpendicular to the longitudinal direction L. The first conveyor segment 16 further has at least a one conveyor surface 46 (herein referred to as a first conveyor surface) that extends between the first and second segment ends 16a and 16b. For example, the first conveyor segment 16 can define a first (e.g., upper) track. The first track can include a first rail 38 and a second rail 40 offset from one another along the lateral direction A by a track width $W_T$. The first and second rails 38 and 40 can each include an upper surface 46 that is configured to support wheels of the container carriers 17.

The first conveyor segment 16 is configured to carry container carriers 17, and hence storage containers 15, along the first conveyor surface 46 from the first terminal free end 16a to the second terminal free end 16b along a first longitudinal direction $L_1$ when the conveyor segments operate in a clockwise direction as viewed. Additionally or alternatively, the first conveyor segment 16 can be configured to carry container carriers 17 along the conveyor surface 46 from the second end 16b to the first end 16a along a second longitudinal direction $L_2$, opposite the first longitudinal direction $L_1$, when the conveyor segments operate in a counterclockwise direction as viewed.

Similarly, the second conveyor segment 18 has a first segment end 18a, and a second segment end 18b that is offset from the first segment end 18a along the longitudinal direction L. The first and second segment ends 16a and 16b can be terminal free ends that are free from a fixed connection to another track. The second conveyor segment 18 is elongate from the first segment end 18a to the second segment end 18b. The second conveyor segment 18 has a first lateral side 18c and a second lateral side 18d spaced from the first lateral side 18c along the lateral direction A. The second conveyor segment 18 further has at least one conveyor surface 46 (herein referred to as a second conveyor surface) that extends between the first and second segment ends 18a and 18b. For example, the second conveyor segment 18 can define a second (e.g., lower) track. The second track can include a first rail 42 and a second rail 44 offset from one another along the lateral direction A by the track width $W_T$. The rails 42 and 44 can each include an upper surface 46 that is configured to support wheels of the container carriers 17.

The second conveyor segment 18 is configured carry container carriers 17, and hence storage containers 15, along the second conveyor surface 18e from the second end 18b to the first end 18a along the second longitudinal direction $L_2$ when the conveyor segments operate in a clockwise direction as viewed. Additionally or alternatively, the second conveyor segment 18 can be configured to carry container carriers 17 along the second conveyor surface 46 from the first end 18a to the second end 18b along the first longitudinal direction $L_1$ when the conveyor segments operate in a counterclockwise direction as viewed.

The storage module 10 can include one or more supports that couple the first and second conveyor segments 16 and 18 to one another. For instance, the storage module 10 can include one or more supports, such as one or more posts 48, that are coupled to the first upper track 38 and the first lower rail 42 so as to position the first upper rail 38 above the first lower rail 42. Similarly, the storage module 10 can include one or more supports, such as one or more posts 48, that are coupled to the second upper rail 40 and the second lower rail 44 so as to position the second upper rail 40 above the second lower rail 44. The posts 48 can be coupled to one another to form the posts 113 of the storage system 100 in FIG. 1. Alternatively, each post 48 can be substituted for an elongate post 113 that couples multiple storage modules 10 of the storage system 100 to one another. The storage module 10 can optionally include one or more supports (not shown) that couple the first upper rail 38 to the second upper rail 40 so as to space the first and second upper rails 38 and 40 from one another along the lateral direction A, and one or more supports (not shown) that couple the first lower rail 42 to the second lower rail 44 so as to space the first and second lower rail 42 and 44 from one another along the lateral direction A.

The third and fourth conveyor segments 20 and 22 are configured to transfer storage containers 15 between the first and second conveyor segments 16 and 18. Thus, the third and fourth conveyor segments 20 and 22 can be considered to be connecting conveyor segments. The third and fourth conveyor segments 20 and 22 are offset from one another along the longitudinal direction L. Each of the third and fourth conveyor segments 20 and 22 are configured to transfer storage containers 15 between the first and second conveyor segments 16 and 18. For example, each of the third and fourth conveyor segments 20 and 22 can be configured to convey storage containers 15 along the vertical direction V from one of the first and second conveyor segments 16 and 18 to the other one of the first and second conveyor segments 16 and 18. In some embodiments as shown in FIG. 1, the third and fourth conveyor segments 20 and 22 can be implemented as first and second vertical lifts 60(1) and 60(2), respectively. Each vertical lift 60(1) and 60(2) can be configured to transfer the storage containers 15 along the vertical direction V between the first and second conveyor segments 16 and 18. Thus, the first and second conveyor segments 16 and 18 can each define a discontinuous conveyor segment, and the vertical lifts can transfer the storage containers 15 between the discontinuous conveyor segments. However, in alternative embodiments, the third and fourth conveyor segments 20 and 22 can include conveyor surfaces such as (without limitation) tracks that connect the first and second conveyor segments 16 and 18. Thus, in such alternative embodiments, the first to fourth conveyor segments 16, 18, 20, and 22 together can define a continuous conveying surface or track.

The first vertical lift 60(1) can be configured to transfer container carriers 17, and hence storage containers 15, between the first end 16a of the first conveyor segment 16 and the first end 18a of the second conveyor segment 18. For instance, the first vertical lift 60(1) can transfer container carriers 17 from the first end 16a of the first conveyor segment 16 to the first end 18a of the second conveyor segment 18 when the storage module 10 operates in the counterclockwise direction, and from the first end 18a of the second conveyor segment 18 to the first end 16a of the first conveyor segment 16 when the storage module 10 operates in the clockwise direction. The first vertical lift 60(1) can be configured to move at least one container carrier 17 at a time. For example, in the embodiment shown, the first vertical lift 60(1) moves only one carrier 17 at a time. The first vertical lift 60(1) is configured to move in a direction opposite the movement path 19 to receive each container carrier 17, and then move the container carrier 17 along the movement path 19. When the first vertical lift 60(1) moves the at least one container carrier between the first and second conveyor segments 16 and 18, at least some, up to all, of the container carriers on the first and second conveyor segments 16 and 18 can remain stationary. In other words, the storage module 10 can be configured such that at least some of the container carriers 17, and hence the storage containers 15, remain stationary while the first vertical lift 60(1) moves at least one container carrier 17 between the first and second conveyor segments 16 and 18.

Similarly, the second vertical lift 60(2) is configured to transfer container carriers 17 between the second end 16b of the first conveyor segment 16 and the second end 18b of the second conveyor segment 18. For instance, the second vertical lift 60(2) can transfer container carriers 17 from the second end 16b of the first conveyor segment 16 to the second end 18b of the second conveyor segment 18 when the storage module 10 operates in the clockwise direction, and from the second end 18b of the second conveyor segment 18 to the second end 16b of the first conveyor segment 16 when the storage module 10 operates in the counterclockwise direction. The second vertical lift 60(2) can be configured to move at least one container carrier 17 at a time. For example, in the embodiment shown, the second vertical lift 60(2) moves only one carrier 17 at a time. The second vertical lift 60(2) is configured to move in a direction opposite the movement path 19 to receive each container carrier 17, and then move the container carrier 17 along the movement path 19. When the second vertical lift 60(2) moves the at least one container carrier between the first and second conveyor segments 16 and 18, at least one, up to all, of the container carriers 17 on the first and second conveyor segments 16 and 18 can remain stationary. In other words, the storage module 10 can be configured such that at least some of the container carriers 17, and hence the storage containers 15, remain stationary while the second vertical lift 60(2) moves at least one container carrier 17 between the first and second conveyor segments 16 and 18.

The storage module 10 can include at least one controller 24 configured to provide at least one control signal to the vertical lifts 60(1) and 60(2) and to at least one movement system 50(1) to 50(4) so as to control the movement of the container carriers 17 around the movement path 19. In some embodiments, the controller 24 can control the speed in which the container carriers 17 are moved. Further, in some embodiments, the controller 24 can control the direction in which the container carriers 17 are moved. Yet further, in some embodiments, the controller 24 can stop the vertical lifts 60(1) and 60(2) and the at least one movement system 50(1) to 50(4) when a desired one of the container carriers 17 is presented at one of the first end 12 and the second end 14.

Referring now to FIGS. 4 and 5, each storage container 15 can be any suitable storage container configured to carry one or more inventory items therein. Preferably, the inventory storage containers 15 are open-top plastic totes configured to carry items in an e-commerce supply chain. The totes are of a size that an individual person or robot can lift. For example, each storage container 15 can be a rectangular structure, such as a bin or tote, formed from a rigid material such as high-density plastic, wood, aluminum, or other suitable material. Each storage container 15 can have a pair of opposed container sidewalls 15a and 15b that are spaced opposite from one another. Each storage container 15 can have a pair of opposed container end walls 15c and 15d that are spaced opposite from one another. The opposed container end walls 15c and 15d can extend between the opposed container sidewalls 15a and 15b. Similarly, the opposed container sidewalls 15a and 15b can extend between the opposed container end walls 15c and 15d.

Each container 15 has a width Ws from one of the sidewalls 15a and 15b to the other one of the sidewalls 15a and 15b, and can have a length Ls from one of the end walls 15c and 15d to the other one of the end walls 15c and 15d. In some embodiments, the length Ls can be greater than the width Ws. Each storage container 15 can further have an upper end 15e and a bottom surface 15f spaced from one another along the vertical direction V. The bottom surface 15f can extend between the opposed sidewalls 15a and 15b and between the opposed end walls 15c and 15d. The upper end 15e can be open for ease of access in placing inventory items into, and retrieving inventory items from, the storage container 15. Each container 15 can have a height Hs from the upper end 15e to the bottom surface 15f.

The size of a storage container 15 may be selected to optimize storage density of the stackable storage module or other suitable parameter. This may depend on the size and type of items to be stored in the storage container 15. For example, the storage container 15 may have a height of about 18", a width of about 18", and a length of about 24". However, the dimensions of the storage container 15 can be different than those just recited. The items held by the storage container 15 can be any suitable item stored in a material storage facility including, for example, personal electronic devices, computers, recreational equipment, food products, television sets, clothing, household supplies, automotive parts, books, loaded pallets, and any other suitable object capable of being stored.

The storage containers 15 can be stackable on top of one another. For example, the bottom surface 15f of an upper one of the storage containers 15 can be received in the opening of the upper end 15e of a lower one of the storage containers 15. The upper end 15e of the lower storage container 15 can be configured to support the bottom surface 15f of the upper storage container 15 such that the bottom surface 15f of the upper storage container 15 nests inside the opening of the lower storage container 15. Each container 15 can also include at least one protrusion 15g, each extending outwardly from at least one of the container sidewalls and end walls. For example, each container 15 can include a plurality of protrusions 15g, each extending outwardly from at least one of the sidewalls and end walls at a corner of the container 15 adjacent the upper end 15e. The protrusions 15g can define an upper rim around the upper end 15e of the storage container 15. At least one protrusion 15g can define a handle that is configured to be engaged for carrying. At least one protrusion 15g can include a lower surface that is configured to be engaged by a prong of an end effector of a robotic arm (not shown), fork lift, or other lifting machine. For example, a storage container 15 can include a pair of the protrusions 15g disposed on opposite sides or ends of the container 15 that are configured to be engaged by a pair of prongs.

Each storage container 15 may include an identifier (e.g., bar code, QR code, radio-frequency identification (RFID) tag, and any other suitable identifier). The identifier may be used to uniquely identify the storage container 15. In some examples, the identifier may include non-volatile data storage, which may be associated with the storage container 15 and/or its contents. Data can be read/written to the data storage each time the stackable storage module is accessed. This data may contain status of the stackable storage module, inventory stowed in the stackable storage module, and/or destination information for each storage container 15. In this manner, inventory information may be updated when the identifiers are read.

With continued reference to FIGS. 4 and 5, each container carrier 17 can have a rectangular or other suitably shaped carrier body 26. The carrier body 26 can have a pair of opposed carrier sides 26a and 26b that are spaced opposite from one another along the lateral direction A. The carrier body 26 can have a pair of opposed carrier ends 26c and 26d that are spaced opposite from one another along the longitudinal direction L. The opposed carrier ends 26c and 26d can extend between the opposed carrier sides 26a and 26b. Similarly, the opposed carrier sides 26a and 26b can extend between the opposed carrier ends 26c and 26d. The carrier body 26 has a width Ws from one of the carrier sides 26a and 26b to the other one of the carrier sides 26a and 26b, and has a length Ls from one of the carrier ends 26c and 26d to the other one of the carrier ends 26c and 26d.

Each container carrier 17 can include at least one conveyor-segment engagement feature that is configured to engage the conveyor segments 16, 18, 20, and 22 so that the container carrier 17 can be translated around the movement path 19. Each of the at least one conveyor-segment engagement feature can be disposed at one of the carrier sides 26a or 26b or can be disposed at another location of the container carrier 17. In some embodiments, the at least one conveyor-segment engagement feature can include at least one wheel assembly 28, such as a plurality of wheel assemblies 28. However, it will be understood that, in alternative embodiments, the at least one conveyor segment engagement feature can include a feature other than a wheel assembly. For example, each conveyor-segment engagement feature can be a rod or pin that engages a bearing or chain of tracks of the conveyor segments 16, 18, 20, and 22.

Each wheel assembly 28 can include a wheel 34 that rotates about an axis that extends along the lateral direction A. The container carriers 17 can be configured such that their respective wheels 34 roll along the upper track surfaces 46 of the conveyor segments. Each wheel assembly 28 can include a flange 36 (shown in the enlarged view of FIG. 2) that is outwardly spaced from the wheel 34 along the lateral direction A. Each wheel 34 can have a wheel diameter along a select direction that is perpendicular its rotational axis, and each flange 36 can have an outer dimension along the select direction that is greater than the wheel diameter. Each flange 36 can be configured to ride along an outer side of the upper and lower tracks so as to prevent its respective wheel 34 from riding off of the tracks. Each wheel assembly can additionally or alternatively include an inward flange (not shown) that is configured in a manner similar to that described above but is inwardly spaced from the wheel 34 along the lateral direction A. Each inward flange can be configured to ride along an inner side of the upper and lower tracks so as to prevent its respective wheel 34 from riding off of the tracks.

The wheel assemblies 28 of each container carrier 17 can include a first wheel assembly 28 at a first carrier side 26a and a second wheel assembly 28 at a second carrier side 26b. The wheels 34 of the first and second wheel assemblies 28 can be spaced from one another along the lateral direction A by the track width $W_T$. Thus, the wheels 34 of the first and second wheel assemblies 28 are spaced from one another such that the wheels 34 ride along tracks of the first to fourth conveyor segments 16, 18, 20, and 22. Each container carrier 17 can optionally include a third wheel assembly 28 at the first carrier side 26a and a fourth wheel assembly at the second carrier side 26b. The third and fourth wheel assemblies 28 can be spaced from the first and second wheel assemblies along the longitudinal direction L. The wheels 34 of the third and fourth wheel assemblies 28 can be spaced from one another along the lateral direction A by the track width $W_T$. Thus, the wheels 34 of the third and fourth wheel assemblies 28 can be spaced from one another such that the wheels 34 ride along tracks of the first to fourth conveyor segments 16, 18, 20, and 22.

Each container carrier 17 can include at least one stop 35. Each stop 35 can be a protrusion that extends outwardly from one of the carrier sides 26a and 26b. For example, each container carrier 17 can include first and second stops 49, wherein the first stop 35 extends from a first carrier side 26a and the second stop 35 extends from a second carrier side 26b. The first and second stops 35 can be offset from one another along the lateral direction A by the track width $W_T$.

In other words, the first and second stops 35 can be aligned over the first and second tracks of one of the upper and lower conveyor segments 16 and 18 along the vertical direction V. Thus, each stop 35 can be configured to contact one of the first and second tracks to prevent the container carrier 17 from falling down below the tracks in the event that one or more of the carrier wheel assemblies 28 breaks or separates from the container carrier body 26.

Each container carrier 17 can include at least one engagement feature 37 that is configured to be engaged by a catch 52 (discussed below) to move the container carrier 17 along the upper and lower conveyor segments 16 and 18. Each engagement feature 37 can be a protrusion that extends outwardly from a respective one of the carrier sides 26a and 26b. For example, each container carrier 17 can include first and second engagement features 37, wherein the first engagement feature 37 extends from the first carrier side 26a and the second engagement feature 37 extends from the second carrier side 26b. In alternative embodiments, the engagement feature 37 can be a side or end of a container carrier 17 or another suitable feature such as an opening that receives a protrusion carried by the catch 52.

Each container carrier 17 can include at least one bumper 39, such as a plurality of bumpers 39, each disposed on an outer surface of one of the carrier ends 26c or 26d. The bumpers 39 are configured and positioned to abut adjacent container carriers 17 so as to limit contact between the container bodies 26 of adjacent container carriers 17, or prevent such contact altogether. The bumpers 39 are configured to dampen noise that results from the container carriers 17 colliding with one another as they are moved around the movement path 19. The bumpers 39 can be pieces of a noise dampening material such as rubber, silicone, or other suitable material for dampening noise, and may have any suitable shape. In the embodiment shown, the bumpers 39 are rectangular shaped blocks; however, the bumpers 39 can have other suitable shapes.

In at least some examples, the container carrier 17 also includes an identifier. The identifiers may be used to identify a position of the container carrier 17 (and the storage container 15) with respect to the stackable storage module. In some examples, the stackable storage module (or system in which the stackable storage module is implemented) may include any suitable combination of encoders, RFID readers and antenna, cameras, and/or other sensing devices for identifying and locating the container carriers 17 and/or the storage containers 15.

Each container carrier 17 can be configured to support at least one inventory storage container 15. For example, each container carrier 17 can be configured to support a row of inventory storage containers 15 such that the storage containers 15 are offset from one another along the lateral direction A. In such a case, each carrier body 26 can have a carrier width Ws along the lateral direction A from one of the carrier sides 26a and 26b to the other one of the carrier sides 26a and 26b that is greater than a carrier length Ls along the longitudinal direction L from one of the carrier ends 26c and 26d to the other one of the carrier ends 26c and 26d.

The storage containers 15 can be supported in a side-by-side relation such that the opposed sidewalls 15a and 15b of each storage container 15 are spaced from one another along the lateral direction A and at least one sidewall 15a or 15b of each storage container 15 faces a sidewall 15a or 15b of one another one of the storage containers 15 along the lateral direction A. In alternative embodiments (not shown), each container carrier 17 can be configured to support the storage containers 15 in an end-to-end relation such that the opposed end walls 15c and 15d of each storage container 15 are spaced from one another along the lateral direction A and at least one end wall 15c or 15d of each storage container 15 faces an end wall 15c or 15d of one another one of the storage containers 15 along the lateral direction A. Each container carrier 17 can also be configured to support the storage containers 15 in a stacked relation, such that each of one or more containers 15 of the first row has a container stacked thereon. Thus, each container carrier can be configured to support the first row of storage containers 15 and at least a second row of storage containers 15 stacked on the first row.

Each carrier body 26 can include a carrier upper end 26e and a carrier lower end 26f spaced from one another along the vertical direction V. Each carrier body 26 can define a plurality of openings 30 that extend through the upper and lower ends 26e and 26f. Further, each carrier body 26 can include at least one divider 32, such as a plurality of dividers 32. Each divider 32 can extend from one of the carrier ends 26c and 26d to the other along the longitudinal direction L. Each divider 32 can separate adjacent ones of the openings 30. Each opening 30 can be sized to receive a storage container 15 therein. Each opening 30 can be sized such that a lower portion of a corresponding container 15 extends through the opening 30, and the carrier upper end 26e supports an upper portion of the container 15. For example, each opening 30 can have a dimension along a select direction that is greater than a corresponding dimension along the select direction of one of the storage containers 15 at its bottom surface 15f, but less than a dimension along the select direction of the storage container 15 at a location that includes the at least one protrusion 15g. Thus, when a storage container 15 is supported by a container carrier 17, the at least one protrusion 15g of the storage container 15 rests on the container carrier 17, such as on the carrier upper end 26e. For example, the protrusions 15g can define an upper rim around the upper end 15e of the storage container 15, and the upper rim can rest on the container carrier 17. In alternative embodiments, each carrier 17 can be devoid of openings and the containers 15 can rest on a surface of the carrier 17.

The storage containers 15 can be densely packed within each container carrier 17 along the lateral direction A. For example, the storage containers 15 carried by each container carrier 17 can be arranged side-to-side (or end-to-end) such that there is little to no space between adjacent ones of the storage containers 15. In some embodiments, storage containers 15 carried by each container carrier 17 may contact one another other. In other embodiments, the storage containers 15 may be spaced from each other by a distance that is no more than 10 percent of the overall width of each storage container 15 or no more than 5 percent of the overall width of each storage container 15.

The storage containers 15 in the storage module 10 can be densely packed along the vertical direction V. In particular, the storage containers 15 on the upper conveyor segment 16 can be stacked above the storage containers 15 on the lower conveyor segment 18 so that the space between each storage container 15 on the bottom level and the first conveyor segment 16 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers, such as a spacing that is no more than 20 percent of the height of the storage containers, such as no more than 15 percent of the height of the storage containers, such as no more than 10 percent of the height of the storage containers, or such as no more than 5 percent of the height of the storage containers. Storage density is inversely proportional to the distance between a storage container and the conveyor segment 16 immediate over top of the storage container. Thus, as this distance is decreased, the storage density increases.

The storage containers 15 can be supported by the container carriers 17 along the upper and lower conveyor segments 16 and 18 such that the storage containers 15 are densely packed along the upper and lower conveyor segments 16 and 18 along the longitudinal direction L. For example, the container carriers 17 carried by the upper conveyor segment 16 can be arranged end-to-end such that there is little to no space between storage containers 15 of adjacent ones of the container carriers 17. Similarly, the container carriers 17 carried by the lower conveyor segment 18 can be arranged end-to-end such that there is little to no space between storage containers 15 of adjacent ones of the container carriers 17. In some embodiments, container carriers 17 and/or storage containers 15 along each conveyor segment may contact one another other. In other embodiments, the storage containers 15 supported by adjacent container carriers 17 may be spaced from each other by a distance that is no more than 10 percent of the overall length or width of each storage container 15 along the longitudinal direction L or no more than 5 percent of the overall length or width of each storage container 15 along the longitudinal direction L. As each container carrier 17 is moved from one of the first and second conveyor segments 16 and 18 to the other, the container carrier 17 is separated from the container carriers 17 supported by the first and second conveyor segments 16 and 18, thereby avoiding collisions between the moving container carrier 17 and the container carriers 17 supported by the first and second conveyor segments 16 and 18. As a result, the storage containers 15 supported by the first and second conveyor segments 16 and 18 can be spaced closer to one another than in comparable carousel systems where all of the storage units are rotated concurrently.

The storage modules 10 in a vertical stack can be stacked over one another so that the space between the storage containers 15 of each storage module 10 and a storage module 10 immediately over top of the storage module 10 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers 15, such as a spacing that is no more than 20 percent of the height of the storage container 15, such as no more than 15 percent of the height of the storage container 15, such as no more than 10 percent of the height of the storage container 15, or such as no more than 5 percent of the height of the storage container 15. Storage density is inversely proportional to the distance between the storage containers 15 of vertically adjacent storage modules 10. Thus, as this distance is decreased, the storage density increases.

Returning back to FIG. 2, each of the at least one movement system 50(1) to 50(4) can be configured to engage the container carriers 17 to push the container carriers 17 along the tracks of the upper and lower conveyor segments 16 and 18. The at least one movement system 50(1) to 50(4) and the vertical lifts 60(1) and 60(2) can operate in alternating fashion. Thus, the at least one movement system 50(1) to 50(4) can push container carriers 17 along the longitudinal direction L, while the vertical lifts 60(1) and 60(2) are not transferring container carriers 17 along the vertical direction V. The first and second vertical lifts 60(1) and 60(2) can be configured to transfer container carriers 17 along the vertical direction, while the at least one movement system 50(1) to 50(4) is not pushing container carriers 17 along the longitudinal direction L.

In some embodiments, the at least one movement system can include a plurality of movement systems 50(1) to 50(4) configured to move the container carriers 17. For instance, the storage module 10 can include a first movement system 50(1) that is configured to engage an container carrier 17 so as to push the container carrier 17 towards the second module end 14. The container carrier 17 engaged by the first movement system 50(1) in turn pushes the downstream container carriers 17 towards the second module end 14. The first movement system 50(1) can push the container carriers 17 along the longitudinal direction without any container carriers 17 moving from one of the upper and lower conveyor segments 16 and 18 to the other of the upper and lower conveyor segments 16 and 18 along the vertical direction V.

The storage module 10 can include a second movement system 50(2) that is configured to engage an container carrier 17 so as to push the container carrier 17 towards the first module end 12. The container carrier 17 engaged by the second movement system 50(2) in turn pushes the downstream container carriers 17 towards the first module end 12. The second movement system 50(2) can push the container carriers 17 along the longitudinal direction without any container carriers 17 moving from one of the upper and lower conveyor segments 16 and 18 to the other of the upper and lower conveyor segments 16 and 18 along the vertical direction V.

The storage module 10 can include a third movement system 50(3) that is configured to engage a container carrier 17 so as to push the container carrier 17 towards the second module end 14. The container carrier 17 engaged by the third movement system 50(3) in turn pushes the downstream container carriers 17 towards the second module end 14. The third movement system 50(3) can be spaced from the first movement system 50(1) along the lateral direction A, and can be configured to operate together with the first movement system 50(1). Thus, the first movement system 50(1) can be configured to engage an container carrier 17 at its first carrier side 26a, and the third movement system 50(3) can be configured to engage the container carrier 17 at its second carrier side 26b.

The storage module 10 can include a fourth movement system 50(4) that is configured to engage an container carrier 17 so as to push the container carrier 17 towards the first module end 12. The container carrier 17 engaged by the fourth movement system 50(4) in turn pushes the downstream container carriers 17 towards the first module end 12. The fourth movement system 50(4) can be spaced from the second movement system 50(2) along the lateral direction A, and can be configured to operate together with the second movement system 50(2). Thus, the second movement system 50(2) can be configured to engage an container carrier 17 at its first carrier side 26a, and the fourth movement system 50(4) can be configured to engage the container carrier 17 at its second carrier side 26b.

Each movement system 50(1) to 50(4) is configured to move the inventory storage containers 15 along the movement path 19. In one embodiment, each movement system can include at least one catch 52 that is coupled to an actuator 51. The catch 52 can be configured to engage at least one of a container carrier 17 and a storage container 15 so as to push or pull the at least one of the container carrier 17 and a storage container 15 along the movement path 19. The actuator 51 can be configured to move the catch 52 back and forth along the longitudinal direction L so as to push or pull the at least one of the container carrier 17 and a storage container 15. In some embodiments, each catch 52 can be configured to engage and move at least one of a container carrier 17 and a storage container 15 along each of the first and second conveyor segments 16 and 18.

Each movement system 50(1) to 50(4) can include a rail 61 (shown in FIG. 3) that extends along the longitudinal direction L. The rail 61 can be a linear bearing rail. The catch 52 can be coupled to the rail 61 and configured to ride along the rail 61 along the longitudinal direction L. Use of the rail 61 can limit the torque placed by the catch 52 on the actuator 51 and can maintain alignment of each carrier engagement surface 56 of the catch 52 with one of the first and second conveyor segments 16 and 18 along the longitudinal direction L.

Although not shown, the storage module 10 can include a plurality of pivoting hooks 80 are configured in a manner similar to, and that operate in a manner similar to, those discussed in PCT/US2018/013920. The pivoting hooks can be configured to engage the container carriers 17 so as to prevent more than a predetermined number of container carriers 17 (e.g., more than one container carrier) on the upper and lower conveyor segments 16 and 18 from moving outwardly onto a respective one of the first and second vertical lifts 60(1) and 60(2).

Referring to FIGS. 2 and 3, each vertical lift 60(1) and 60(2) is configured to transfer container carriers 17 between the upper and lower conveyor segments 16 and 18. In so doing, each vertical lift 60(1) and 60(2) can be configured to be moved between a lowered position, wherein the vertical lift is vertically aligned with the lower conveyor segment 16, and a raised position, wherein the vertical lift is vertically aligned with the upper conveyor segment 18. Each vertical lift 60(1) and 60(2) can be configured to operate in a unidirectional manner to transfer container carriers 17 from one of the upper and lower conveyor segments 16 and 18 to the other one of the upper and lower conveyor segments 16 and 18. Alternatively, each vertical lift 60(1) and 60(2) can be configured to operate in a bidirectional manner to transfer container carriers 17 from the upper conveyor segment 16 to the lower conveyor segment 18 and from the lower conveyor segment 18 to the upper conveyor segment 16.

Each vertical lift 60(1) and 60(2) includes at least actuator 51 that is configured to move container carriers 17 between the lowered and raised positions. In some embodiments, each vertical lift 60(1) and 60(2) can include a first actuator 51 and a second actuator 51 that are spaced from one another along the lateral direction A. The first and second actuators 51 can be configured to operate together to move container carriers 17 between the lowered and raised positions.

Each vertical lift 60(1) and 60(2) can include at least one conveyor surface 67 (shown in the enlarged view of FIG. 5) that is configured to support container carriers 17 thereon. The at least one conveyor surface 67 can be considered to be a carrier engagement surface. Each vertical lift 60(1) and 60(2) can be configured to move its respective at least one conveyor surface 67 between the lowered and raised positions. In the embodiment shown, each conveyor surface 67 is defined by a rail 66. However, it will be understood that, in alternative embodiments, the at least one conveyor surface can be implemented using any suitable conveyor elements such as tracks, belts, rollers, skate wheels, balls, any other suitable conveyor elements for translating the container carriers 17, or any suitable combination of conveyor elements.

The actuator 51 of each vertical lift can be configured to cause a respective one of the rails 66 to translate up and down along the vertical direction V. Thus, each actuator 51 of the vertical lifts is configured to raise its conveyor surface 67 to a raised position where the conveyor surface 67 is aligned with the conveyor surface of one of the upper tracks of the upper conveyor segment 16. Further, each actuator 51 of the vertical lifts is further configured to lower its conveyor surface 67 to a lowered position where the conveyor surface 67 is aligned with one of the lower tracks of the lower conveyor segment 18. Each conveyor surface 67 is configured to support wheels 34 of the container carriers 17. The container carriers 17 are sized and positioned such that their respective wheels 34 roll along the conveyor surface 67 of the rail 66. Optionally, each conveyor surface 67 can be ramped downward as it extends away from a center of the storage module 10 so as to prevent a container carrier 17 on the conveyor surface 67 from rolling from vertical lift towards the upper and lower conveyor segments 16 and 18 as the vertical lift is moving between the raised and lowered positions. The ramped surface 67 can further be used to create separation between a container carrier 17 received on the ramped surface 67 and the container carriers 17 that are disposed on the upper and lower conveyor segments 16 and 18.

Each vertical lift 60(1) and 60(2) can include a rail 76 that extends along the vertical direction V. The rail 76 can be a linear rail. The rail 76 can be supported by a support 71. The conveyor surface 67 can be configured to ride up and down the rail 76 along the vertical direction V as the track moves between the raised and lowered positions. The conveyor surface 67 can be coupled to the rail 76. For example, an outermost end of the rail 66 that supports the conveyor surface 67 can be coupled to the rail 76 such that the rail 66 is cantilevered inwardly towards a center of the storage module 10. The rail 66 can be coupled to the at least one track follower 110 between the outermost end of the rail 66 and an innermost end of the rail 66. For instance, the rail 66 can be coupled to the at least one track follower 110 at a location that is spaced from the outermost end of the rail 66 along the longitudinal direction L. Use of the rail 76 can limit the amount of torque placed by the rail 66 on the at least one track follower 110 and can maintain the rail 66 in an upright orientation such that the rail 66 can be aligned with the upper and lower conveyor segments 16 and 18.

Figure 7:
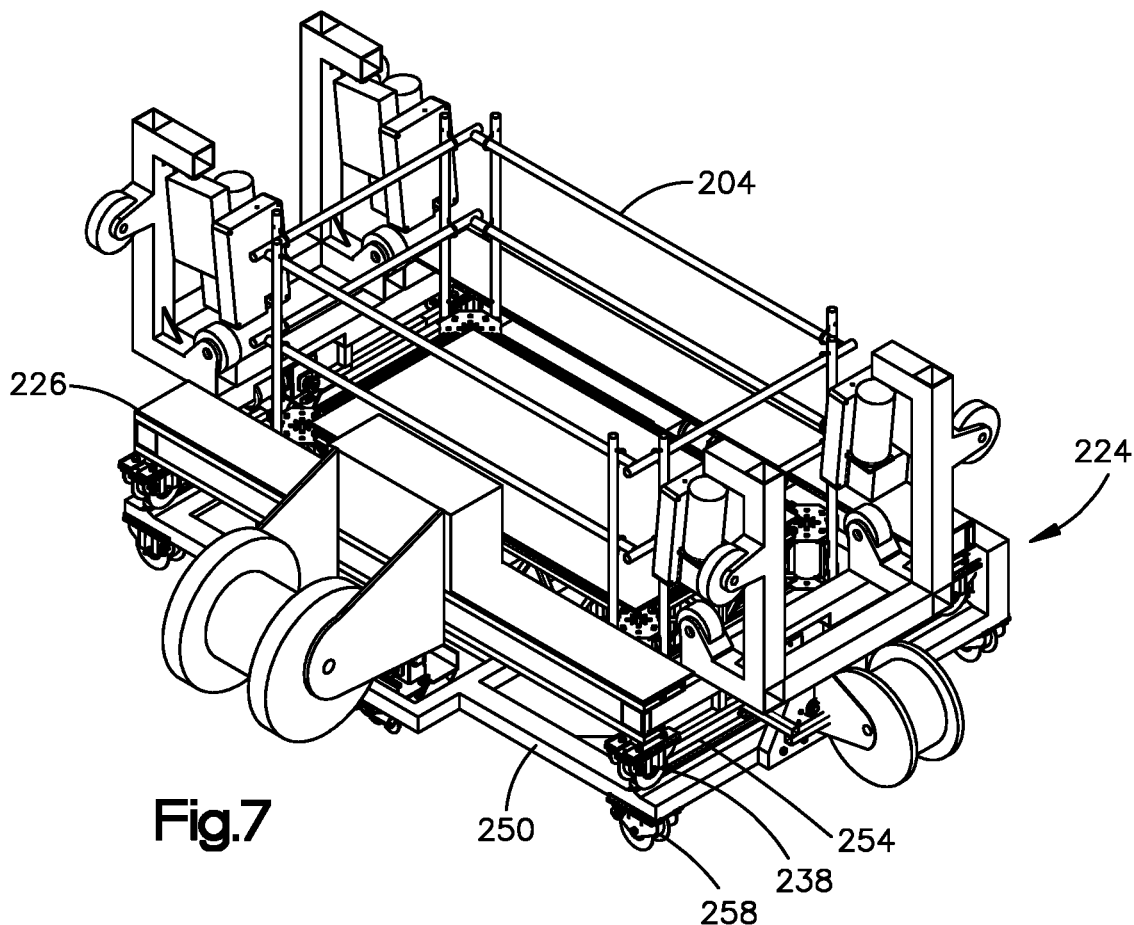
FIG. 7 shows a perspective view of a trolley system of the multi-directional elevator of FIG. 1 according to one example embodiment and a platform of the multi-directional elevator that is supported by the trolley system.
Figure 8:
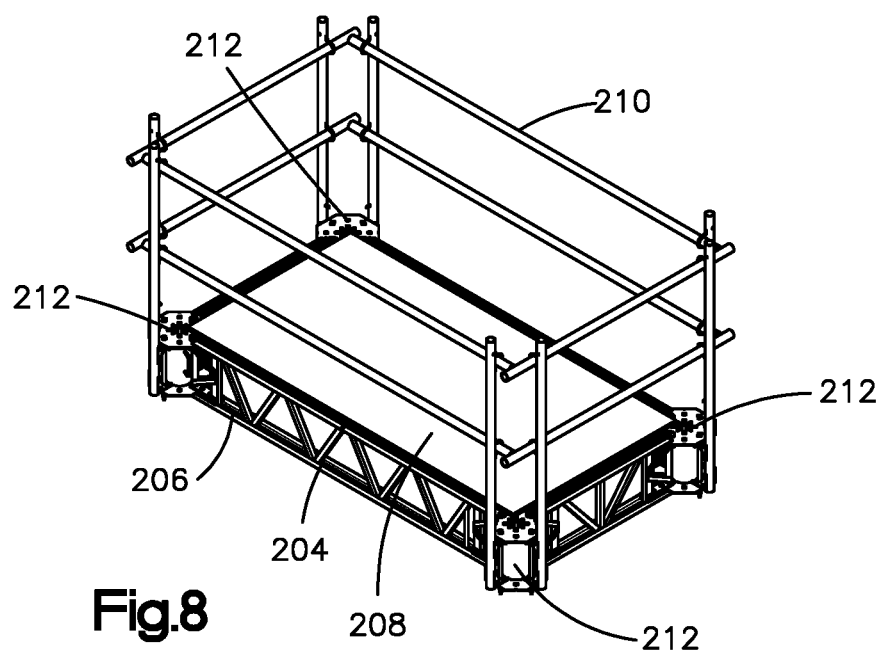
FIG. 8 shows a perspective view of the platform in FIG. 7.

Turning now to FIGS. 6 to 8, the multi-directional elevator 202 comprises a platform 204 and a track system 214 disposed over the at least one vertical stack of storage modules 10. The multi-directional elevator 202 is configured to move the platform 204 over the at least one vertical stack of storage modules 10 along at least one of the longitudinal direction L and the lateral direction A, and lower the platform 204 into an interior of the vertical stack of storage modules 10 through a gap 215 defined between inventory storage containers 15. Thus, the multi-directional elevator 202 is configured to move the platform 204 along at least two directions (e.g., the vertical direction and at least one of the longitudinal and lateral directions), such as along three directions.

The platform 204 can comprise a frame 206, and a floor 208 that is supported by the frame 206. The platform 204 can also comprise a railing 210 that extends upward relative to the floor 208. The railing 210 can extend around the platform 204 so as to define an enclosure 212 that is configured to reduce the likelihood that a person will fall off of the platform 204. The platform 204 can also comprise at least terminator 210, each terminating a wire or chain that raises and lowers the platform 204. In one example, the platform 204 has four terminators 210 located at four corners of the platform 204. However, it will be understood that the platform 204 can have any other suitable number of couplers, such as a pair of terminators 210 that are centrally located on each side of the platform 204. In alternative embodiments, the platform 204 can include hoists instead of terminators 210, and the terminators 210 can be implemented on the trolley system 224 discussed below.

Referring to FIG. 6, the track system 214 can extend along at least one of the longitudinal direction L and lateral direction A. For example, the track system 214 can include one or both of (i) at least one of a longitudinal track 216 that extends the longitudinal direction L, and (ii) a lateral track 218 that extends along the lateral direction A. In some embodiments, the track system 214 can include at least one longitudinal track 216 and at least one lateral track 218. Each longitudinal track 216 can include at least one rail 220, such as a pair of rails 220, that extend along the longitudinal direction L. The pair of rails 220 can be spaced from one another along the lateral direction A. Each lateral track 218 can include at least one rail 222, such as a pair of rails 222, that extend along the lateral direction A. The pair of rails 222 can be spaced from one another along the longitudinal direction L. In one example, the track system 214 can include a single lateral track 218, and a plurality of longitudinal tracks 216 that extend from the lateral track 218. The single lateral track 218 can be disposed at one of the first and second ends 102 and 104 of the storage system 100 as shown. Thus, the multi-directional elevator 202 can be configured to (i) move the platform 204 along the lateral track 218 until the platform 204 is in line with the gap 215 along the longitudinal direction L, and then (ii) move the platform 204 along a respective one of the longitudinal tracks 216 until the platform 204 is in line with the gap 215 along the vertical direction V. In alterative examples, the single lateral track 218 can be disposed at a location between the first and second ends 102 and 104, or the track system 214 can include a plurality of lateral tracks 218.

The track system 214 can be supported above the at least one vertical stack of storage modules 10 by the frame 112 of the storage system 100. Each of the at least one longitudinal track 216 can be supported by at least one longitudinal beam 115 of the frame 112. For example, each rail 220 of a longitudinal track 216 be supported by one of the longitudinal beams 115; however, it will be understood that the rails 220 can be alternatively supported. Each of the at least one lateral track 218 can be supported by at least one lateral beam 117 of the frame 112. For example, each rail 220 of a longitudinal track 216 be supported by one of the longitudinal beams 115. In one embodiment, the storage system 100 can include a multi-level platform 114 at one of the first and second system ends 102 and 104, and the rails 222 of the lateral track 218 can be disposed over the multi-level platform 114. The multi-level platform 114 can be supported by the frame 112.

Figure 9:
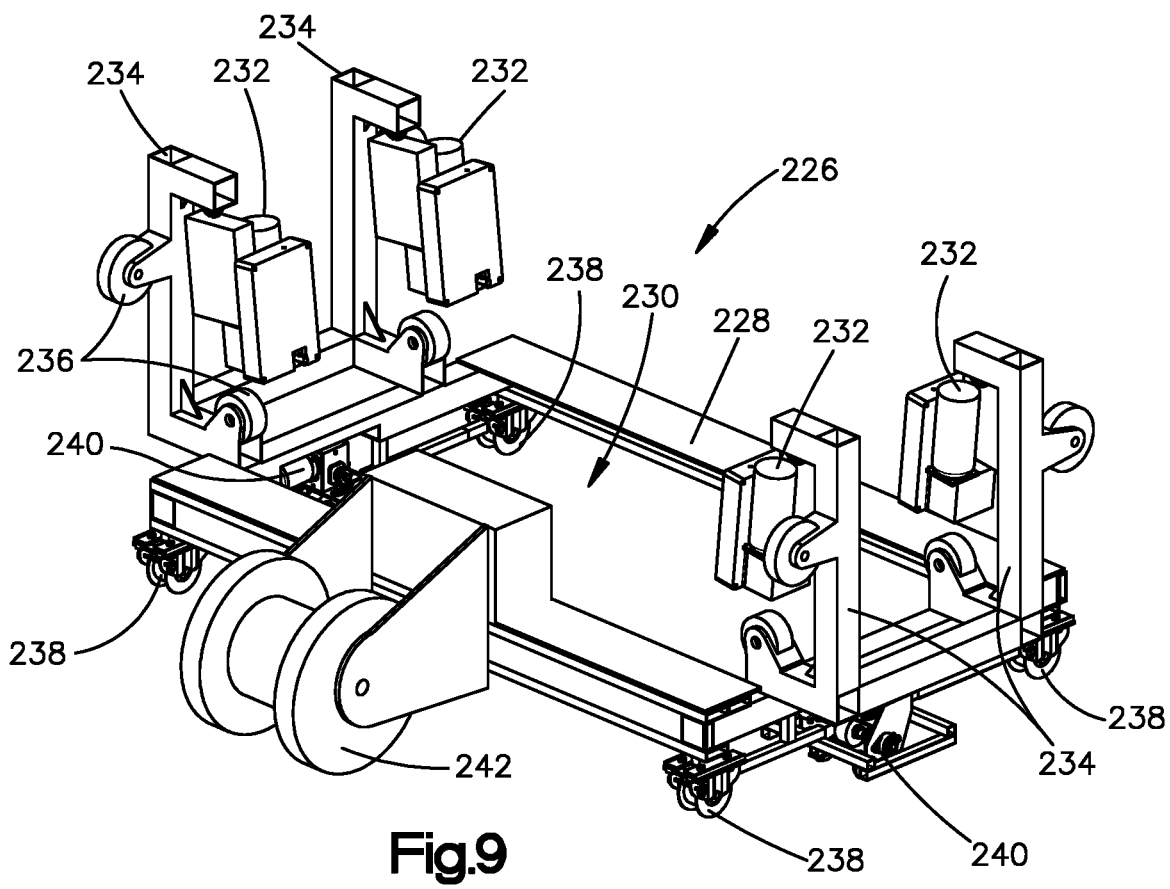
FIG. 9 shows a perspective view of a first trolley of the trolley system of FIG. 7 that supports the platform.

Turning to FIGS. 7 and 9, the multi-directional elevator 202 can include a trolley system 224 that supports the platform 204 and is configured to ride along the track system 214 along at least one of the longitudinal direction L and the lateral direction A. The trolley system 224 comprises a trolley 226 that supports the platform 204. The trolley 226 is configured to raise and lower the platform 204. Further, the trolley 226 is configured to ride along the track system 214 along one of the longitudinal direction L and the lateral direction A. In some embodiments (e.g., where the trolley system 224 moves along the longitudinal direction L and lateral direction A), the trolley system 224 can include a second trolley 250 that supports the trolley 226. In such embodiments, the trolley 226 can be considered to be a first trolley. The second trolley 250 can be configured to ride along the track system 214 along the other one of the longitudinal direction L and lateral direction A. The first trolley 226 can be configured to separate from the second trolley 250 and ride along the track system 214 along the one of the longitudinal direction L and lateral direction A. It will be understood, that in alternative embodiments, the trolley system 224 can include just the first trolley 226.

The trolley 226 can include a frame 228 that is configured to support the platform 204. The trolley 226 can define an opening 230 that extends through the frame 228 such that the platform 204 can be lowered through the opening 230. The trolley 226 can comprise a plurality of hoists or couplers 232 that are supported by the frame 228. Each hoist or coupler 232 can be configured to couple to a wire or chain that raises and lowers the platform 204. In one example, the trolley 226 has four hoists or couplers 232 located at four corners of the trolley 226. However, it will be understood that the trolley 226 can have any other suitable number of hoists or couplers 232, such as a pair of hoists or couplers 232 that are centrally located on each side of the trolley 226. The trolley 226 can include at least one guide pulley 236 for each hoist or coupler 232 that is configured to guide the wire or chain from the hoist or coupler 232 to the platform 204. The at least one guide pulley 236 can route the wire so as to not interfere with any parts of the storage system 100 as the platform 204 is raised and lowered. Each hoist or coupler 232 can be supported by a support 234 of the frame 228. In one example, each support 234 can be an arm that extends upwards from the frame 228. However, it will be understood that the supports 234 can have any other suitable configuration.

The trolley 226 can include at least one, such as a plurality of track engagement features 238. Each track engagement feature 238 can be configured to engage one of the longitudinal and lateral tracks 216 or 218. Each track engagement feature 238 can be any suitable engagement feature that is configured to reduce friction as the trolley 226 rides along the track system 214. For example, each track engagement feature 238 can be a wheel or ball bearing. In at least some embodiments, the trolley 226 can include a plurality of track engagement features 238. For example, the trolley 226 can include at least one pair of wheels that are spaced from one another along the lateral direction A. The at least one pair can include first and second pairs of wheels that are spaced from one another along the longitudinal direction L. Each track engagement feature 238 can be supported on an underside of the frame 228.

The trolley 226 can include at least one drive 240, such as a plurality of drives 240, each configured to drive the trolley 226 along the track system 214 along the one of longitudinal direction L and lateral direction A. Each drive 240 can be configured to engage the track system 214 and push the trolley 226 along the track system 214. For example, each drive 240 can be a friction drive that includes wheels that engage the track. Each drive 240 can also have breaks for stopping movement of the trolley 226. In some embodiments, the at least one drive 240 and the at least one track engagement feature 238 can be separate features. In other embodiments, the at least one drive 240 can be configured to drive the at least one track engagement feature 238 so as to cause the at least one track engagement feature 238 to rotate.

The trolley 226 can optionally include a cable reel 242. The cable reel 242 can be supported by the frame 228 and can be configured to raise objects from, and lower objects into, the storage system 100. The cable reel 242 can be helpful to lift heavy objects such as a full storage bin 15 out of the storage system 100 or lower heavy tools into the storage system 100.

Figure 10:
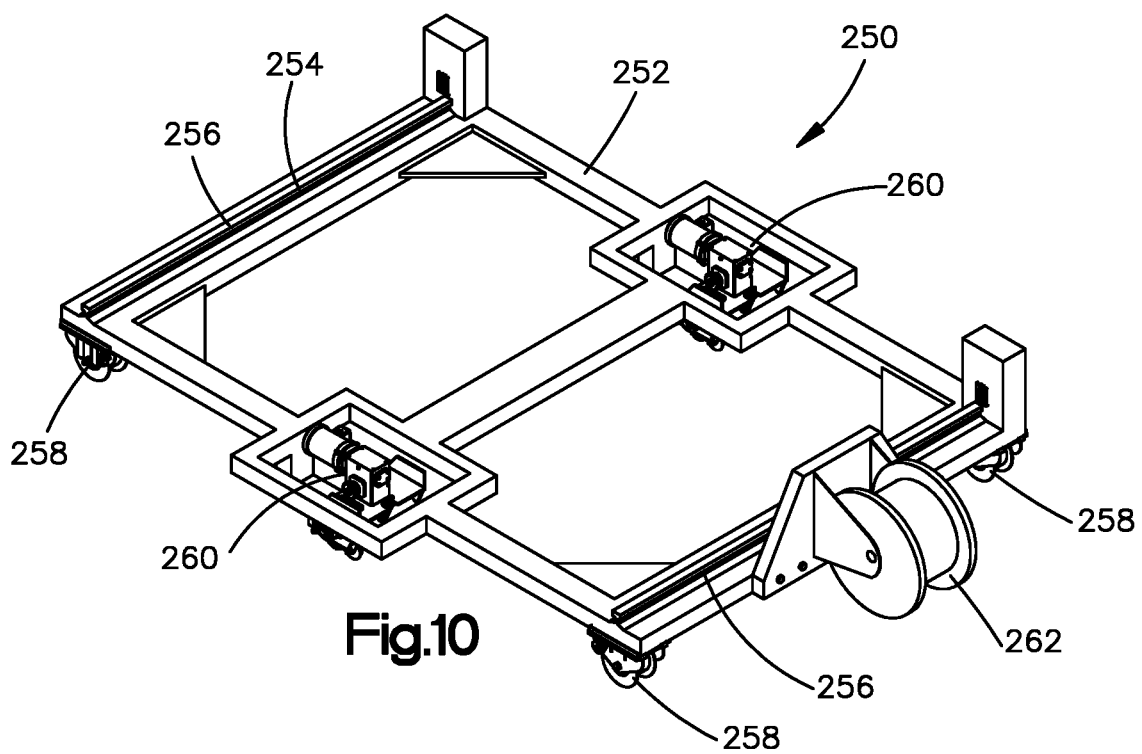
FIG. 10 shows a perspective view of a second trolley of the trolley system of FIG. 7 that supports the first trolley.

Referring now to FIGS. 7 and 10, the second trolley 250 can include a frame 252 that is configured to support the first trolley 226. The second trolley 250 can include a track 254 that is supported by an upper side of the frame 252. The track 254 can extend along one of longitudinal direction L and the lateral direction A. The track 254 is configured to support the first trolley 226 thereon. The track 254 can include at least one rail 256, such as a pair of rails 256 that are spaced from one another along the other one of the longitudinal direction L and the lateral direction A. The first trolley 226 is configured to separate from the second trolley 250 when the first trolley 226 moves along the one of the longitudinal direction L and lateral direction A. The first trolley 226 is configured to ride onto the second trolley 250 when the first trolley 226 moves an opposite direction along the one of the longitudinal direction L and lateral direction A. The at least one engagement feature 238 of the first trolley 226 is configured to 1) ride along the track 254 and onto the track system 214 as the first trolley 226 separates from the second trolley 250 and 2) ride from the track system 214 and onto the track 254 such that that second trolley 250 supports the first trolley 226.

The second trolley 250 can include at least one, such as a plurality of track engagement features 258. Each track engagement feature 258 can be configured to engage one of the longitudinal and lateral tracks 216 or 218. Each track engagement feature 258 can be any suitable engagement feature that is configured to reduce friction as the second trolley 250 rides along the track system 214. For example, each track engagement feature 258 can be a wheel or ball bearing. In at least some embodiments, the second trolley 250 can include a plurality of track engagement features 258. For example, the second trolley 250 can include at least one pair of wheels that are spaced from one another along the longitudinal direction L. The at least one pair can include first and second pairs of wheels that are spaced from one another along the lateral direction A. Each track engagement feature 258 can be supported on an underside of the frame 252.

The trolley 250 can include at least one drive 260, such as a plurality of drives 260, each configured to drive the trolley 250 along the track system 214 along the one of longitudinal direction L and lateral direction A. Each drive 260 can be configured to engage the track system 214 and push the trolley 250 along the track system 214. For example, each drive 260 can be a friction drive that includes wheels that engage the track. Each drive 260 can also have breaks for stopping movement of the trolley 250. In some embodiments, the at least one drive 260 and the at least one track engagement feature 258 can be separate features. In other embodiments, the at least one drive 260 can be configured to drive the at least one track engagement feature 258 so as to cause the at least one track engagement feature 258 to rotate.

The trolley 250 can optionally include a cable reel 262. The cable reel 262 can be supported by the frame 252 and can be configured to raise objects from, and lower objects into, the storage system 100. The cable reel 262 can be helpful to lift heavy objects such as a full storage bin 15 out of the storage system 100 or lower heavy tools into the storage system 100.

As shown in FIG. 7, the track engagement features 238 of the first trolley 226 are disposed at a position that is higher than the track engagement features 258 of the second trolley 250. To match the different heights of the track engagement features 238 and 258, the track system 214 can include at least one first track (e.g., 216 in FIG. 6) for the first trolley 226 that is disposed at a first height, and at least one second track (e.g., 218) for the second trolley 250 that is disposed at a second height, where the first height is greater than the second height. In other words, one of the longitudinal and lateral tracks 216 and 218 is disposed at a location that is higher than the other one of the longitudinal and lateral tracks 216 and 218. The first track can be substantially level with the track 254 of the second trolley 250 such that the first trolley 226 can ride smoothly from the track 254 of the second trolley 259 onto the first track and smoothly from the first track onto the track 254 of the second trolley 259.

Figure 12:
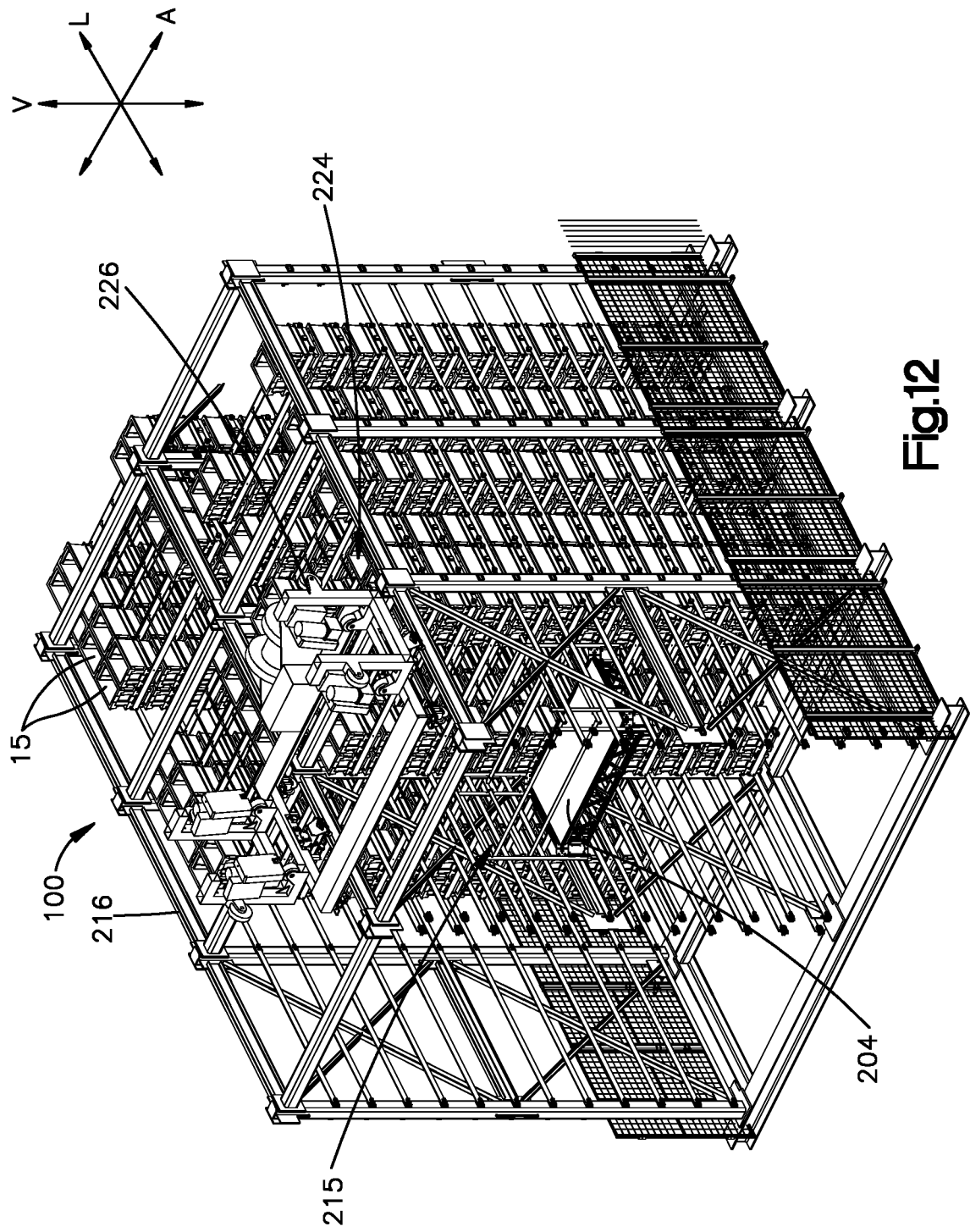
FIG. 12 shows a cross-sectional perspective view of the storage system of FIG. 1 with a platform of the multi-directional elevator lowered into the vertical stack of storage modules.

Turning now to FIGS. 6 and 12, a method of accessing an interior of the inventory storage system 100 of FIG. 1 comprises moving, for at least an upper-most one of the storage modules 10 in the vertical stack, a plurality of the inventory storage containers 15 away from one another along the longitudinal direction L so as to separate the plurality of inventory storage containers 15 and create a gap 215 between the inventory storage containers 15. For example, at least one container carrier 17 can be moved towards one of the first and second module ends 12 and 14 and away from another one of the container carriers 17 so as to separate the storage containers 15. In another example, at least one container carrier 17 can be moved towards one of the first and second module ends 12 and 14 and at least one other container carriers 17 can be moved towards the other one of the first and second module ends 12 and 14.

Figure 11:
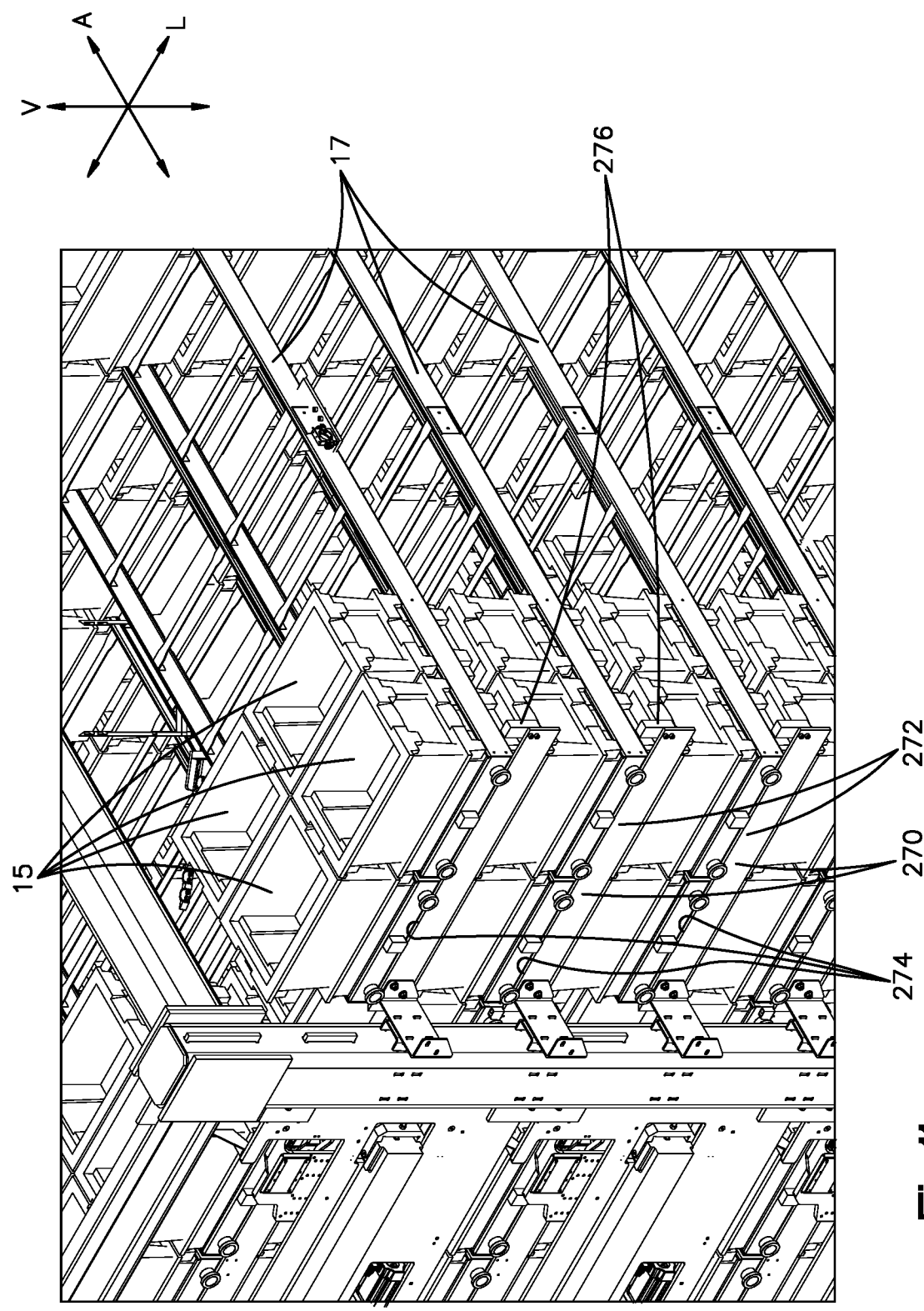
FIG. 11 shows an enlarged perspective view of one end of the storage system of FIG. 1 having a plurality of extensions attached thereto, the plurality of extensions receiving a plurality of container carriers and storage containers.

Turning briefly to FIG. 11, to separate the storage containers 15, the maintenance system 200 can include at least one extension track 270, such as a plurality of extension tracks 270, and the method can comprise attaching at least one extension track 270 to at least the upper-most one of the storage modules 10. Each extension track 270 can be configured to removably couple to one of the first and second module ends 12 and 14 of a storage module 10 when the storage containers 15 are to be separated. Once coupled to one of the first and second module ends 12 and 14, at least one container carrier 17, and hence the storage containers 15 supported thereon, can be pushed onto the extension track 270. Thus, when an extension track 270 is coupled to one of the first and second module ends 12 and 14 of a storage module 10, at least one container carrier 17 can be pushed outside of the closed movement path 19 and onto the extension track 270. In FIG. 11, an example is shown where two container carriers 17 are pushed onto each extension track 270.

An extension track 270 can be removably coupled to only one of the first and second module ends 12 and 14 of a storage module 10 such that at least one of the storage containers 15 can be pushed towards one of the first and second ends 12 and 14 so as to separate storage containers 15. Alternatively, extension tracks 270 can be removably coupled to both the first and second module ends 12 and 14 of a storage module 10 such that storage containers 15 can be pushed away from one another towards the first and second module ends 12 and 14 so as to separate storage containers 15. The extension tracks 270 are removably coupled to at least the upper-most storage module 10 or storage modules, such that when the storage containers 15 are separated so as to create the gap 215, the gap 215 extends down into the storage system 100 from the top of the storage system 100, thereby allowing the platform 204 to be lowered into the gap 215.

Each extension track 270, when coupled to a storage module 10, can be in line with one of the tracks of the first and second conveyor segments 16 and 18 (shown in FIG. 3). Each extension track 270 can include at least one rail 272, such as a pair of rails 272 that are offset from one another along the lateral direction A. Each rail 272 can include an upper surface 274 that is configured to support wheels of the container carriers 17. Each rail 272 can be in line with one of the rails 38, 40, 42, and 44 of the first and second conveyor segments 16 and 18 (shown in FIG. 3). Each rail 272 can include a stop 276 that prevents the container carriers 17 from falling off of the rail 272. At least one extension track 270, up to four extension tracks 270, can be removably coupled to each storage module 10. For example, at least one of an upper extension track 270 can be removably coupled to the first module end 12, a lower extension track 270 can be removably coupled to the first module end 12, an upper extension track 270 can be removably coupled to the second module end 14, and a lower extension track 270 can be removably coupled to the second module end 14.

Turning briefly to FIG. 3, the rails 66 of each vertical lift 60(1) and 60(2) bridge a gap between one of the segment ends (e.g., 16a, 16b, 18a, or 18b) and a corresponding post. However, the storage module 10 defines a gap below the rails 66 of the vertical lifts 60(1) and 60(2) when the lifts are in the upward position that is not bridged by the rails 66. Similarly, the storage module 10 defines a gap above the rails 66 of the vertical lifts 60(1) and 60(2) when the lifts are in the downward position that is not bridged by the rails 66. The maintenance system 200 can include extension rails (not shown), similar to extension rails 272, that can be removably coupled to the storage modules 10 to bridge the gaps where the rails 66 of the vertical lifts 60(1) and 60(2) are not positioned.

Returning to FIGS. 6 and 12, the method can also comprise causing a trolley system 224 of a multi-directional elevator 202 to move along at least one of the longitudinal direction L and the lateral direction A along the track system 214 that is disposed over the at least one vertical stack of storage modules 10 until the platform 204 that is supported by the trolley system 224 is aligned above the gap 215. The platform 204 can then be lowered into the gap 215 so that the interior of the storage system 100 is accessible from the platform 204. The step of causing the trolley system 224 to move can comprise driving a trolley 226 of the trolley system 224 that supports the platform 204 to move along one of a longitudinal track 216 that extends along the longitudinal direction L and a lateral track 218 that extends along the lateral direction A until the trolley 226 is aligned above the gap 215. Further, the lowering step can comprise causing the trolley 226 to lower the platform 204 into the gap 215.

In some examples, the method can comprise, before driving the trolley 226 along the one of the longitudinal and lateral tracks 216 and 218, driving a second trolley 250 of the trolley system 224 along the other one of the longitudinal and lateral tracks 216 and 218, the second trolley 250 supporting the trolley 226. In such examples, the method can comprise separating the trolley 226 from the second trolley 250 and driving the trolley 226 along the one of the longitudinal and lateral tracks 216 and 218 until the trolley 226 is aligned above the gap 215. The separating step can comprise causing the trolley 226 to ride along a track 254 (shown in FIG. 10) of the second trolley 250 as the trolley 226 separates from the second trolley 250.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An inventory storage system, comprising:
    at least one vertical stack of storage modules stacked over one another, each storage module comprising:
        first and second module ends that are spaced from one another along a longitudinal direction;
        first and second conveyor segments, each configured to carry inventory storage containers along the longitudinal direction between the first and second modules ends; and
        third and fourth conveyor segments that are disposed at the first and second module ends, respectively, and that are configured to carry the inventory storage containers between the first and second conveyor segments, wherein the first to fourth conveyor segments define a movement path having a closed shape, and the storage module is configured to translate the inventory storage containers around the movement path until a desired one of the inventory storage containers is presented at one of the first and second module ends; and
    a multi-directional elevator comprising a platform, the multi-directional elevator configured to move the platform over the vertical stack of storage modules along at least one of the longitudinal direction and a lateral direction, perpendicular to the longitudinal direction, and lower the platform into an interior of the vertical stack of storage modules through a gap defined between inventory storage containers.

2. The inventory storage system of claim 1, wherein the multi-directional elevator comprises:
    a track system that is disposed over the vertical stack and extends along at least one of the longitudinal and lateral directions; and
    a trolley system that supports the platform and is configured to ride along the track system along at least one of the longitudinal and lateral directions.

3. The inventory storage system of claim 2, wherein the trolley system comprises a trolley that supports the platform, is configured to raise and lower the platform, and is configured to ride along the track system along one of the longitudinal and lateral directions.

4. The inventory storage system of claim 3, wherein the trolley system comprises a second trolley that supports the trolley and is configured to ride along the track system along the other one of the longitudinal and lateral directions.

5. The inventory storage system of claim 4, wherein the trolley is configured to separate from the second trolley and ride along the track system along the one of the longitudinal and lateral directions.

6. The inventory storage system of claim 3, wherein the track system comprises at least one longitudinal track that extends along the longitudinal direction between the first and second ends, and at least one lateral track that extends along the lateral direction.

7. The inventory storage system of claim 4, wherein the second trolley comprises a track, and the trolley comprises at least one pair of wheels configured to 1) ride along the track as the trolley separates from the second trolley and as the trolley rides onto the second trolley so as to be supported by the second trolley, and 2) ride along the track system when the trolley is separated from the second trolley.

8. The inventory storage system of claim 7, wherein the second trolley comprises at least one pair of wheels configured ride along the track system along the other one of the longitudinal and lateral directions.

9. The inventory storage system of claim 2, wherein the trolley comprises a plurality of hoists that are configured to raise and lower the platform.

10. The inventory storage system of claim 2, wherein the trolley comprises a frame defining an opening therethrough, and the platform is configured to pass through the opening as the platform is raised and lowered.

11. The inventory storage system of claim 4, wherein the trolley comprises a first drive configured to drive the trolley along the track system along the one of the longitudinal and lateral directions, and the second trolley comprises a second drive configured to drive the second trolley along the track system along the other one of the longitudinal and lateral directions.

12. The inventory storage system of claim 2, wherein the track system comprises at least one longitudinal track that extends along the longitudinal direction and at least one lateral track that extends along the lateral direction.

13. The inventory storage system of claim 12, wherein one of the longitudinal and lateral tracks is disposed at a location that is higher than the other one of the longitudinal and lateral tracks such that the trolley is configured to ride off of a second trolley and onto the one of the longitudinal and lateral tracks.

14. A method of accessing an interior of an inventory storage system comprising at least one vertical stack of storage modules that are stacked over one another, each storage module configured to move inventory storage containers along a movement path having a closed shape, the method comprising:
    moving, for at least an upper-most one of the storage modules in the vertical stack, a plurality of the inventory storage containers away from one another along a longitudinal direction so as to separate the plurality of inventory storage containers and create a gap between the inventory storage containers;

causing a trolley system of a multi-directional elevator to move along at least one of the longitudinal direction, and a lateral direction that is perpendicular to the longitudinal direction, along a track system that is disposed over the at least one vertical stack until a platform that is supported by the trolley system is aligned above the gap; and lowering the platform into the gap so that the interior of the storage system is accessible from the platform.

15. The method of claim 14, wherein:

the causing step comprises driving a trolley of the trolley system that supports the platform to move along one of a longitudinal track that extends along the longitudinal direction and a lateral track that extends along the lateral direction until the trolley is aligned above the gap; and the lowering step comprises causing the trolley to lower the platform into the gap.

16. The method of claim 15, wherein the causing step comprises, before driving the trolley along the one of the longitudinal and lateral tracks:

driving a second trolley of the trolley system along the other one of the longitudinal and lateral tracks, the second trolley supporting the trolley; and separating the trolley from the second trolley and driving the trolley along the one of the longitudinal and lateral tracks until the trolley is aligned above the gap.

17. The method of claim 16, where the separating step comprises causing the trolley to ride along a track of the second trolley as the trolley separates from the second trolley.

18. The method of claim 14, wherein each of the storage modules comprises first and second module ends that are spaced from one another along the longitudinal direction, and the moving step comprises attaching an extension track to at least one of the first and second ends of the upper-most one of the storage modules and translating at least one of the inventory storage containers onto the extension so as to separate the plurality of inventory storage containers.

* * * * *